(12) United States Patent
Hisamitsu et al.

(10) Patent No.: US 9,470,827 B2
(45) Date of Patent: Oct. 18, 2016

(54) NEAR-INFRARED REFLECTIVE FILM, METHOD FOR PRODUCING SAME, AND NEAR-INFRARED REFLECTOR PROVIDED WITH NEAR-INFRARED REFLECTIVE FILM

(75) Inventors: Akihito Hisamitsu, Sagamihara (JP); Yasuo Taima, Chofu (JP); Shinichi Suzuki, Hachioji (JP); Noriyuki Kokeguchi, Kokubunji (JP)

(73) Assignee: KONICA MINOLTA, INC., Tokyo (JP)

( * ) Notice: Subject to any disclaimer, the term of this patent is extended or adjusted under 35 U.S.C. 154(b) by 59 days.

(21) Appl. No.: 13/881,909

(22) PCT Filed: Oct. 26, 2011

(86) PCT No.: PCT/JP2011/074663
§ 371 (c)(1),
(2), (4) Date: Apr. 26, 2013

(87) PCT Pub. No.: WO2012/057199
PCT Pub. Date: May 3, 2012

(65) Prior Publication Data
US 2013/0215501 A1    Aug. 22, 2013

(30) Foreign Application Priority Data

Oct. 27, 2010  (JP) .................................. 2010-240511
Dec. 9, 2010   (JP) .................................. 2010-274489

(51) Int. Cl.
*F21V 9/04*    (2006.01)
*G02B 5/20*    (2006.01)
(Continued)

(52) U.S. Cl.
CPC ................ *G02B 5/208* (2013.01); *B05D 5/06* (2013.01); *B05D 7/58* (2013.01);
(Continued)

(58) Field of Classification Search
USPC .......................................... 359/586–589, 360
See application file for complete search history.

(56) References Cited

U.S. PATENT DOCUMENTS 6,387,517 B1 *   5/2002   Belleville .............. C01G 35/00
                                                    106/286.2
6,797,396 B1     9/2004   Liu et al.
(Continued)

FOREIGN PATENT DOCUMENTS

JP    2004-503402 A    2/2004
JP    2004-123766 A    4/2004
(Continued)

OTHER PUBLICATIONS

Machine Translation of JP 2009-086659.*
(Continued)

*Primary Examiner* — Bumsuk Won
*Assistant Examiner* — Balram Parbadia
(74) *Attorney, Agent, or Firm* — Lucas & Mercanti, LLP

(57) ABSTRACT

The near-infrared reflective film is a lamination unit including: a high refractive layer containing a first metal oxide particle and a first water-soluble polymer, a low refractive layer containing a second metal oxide particle and a second water-soluble polymer, and a mixed layer that is located between the high refractive layer and the low refractive layer and contains the first metal oxide particle, the second metal oxide particle, and a third water-soluble polymer. The refractive index of the low refractive layer is smaller than the refractive index of the high refractive layer by 0.1 or more. The first metal oxide particle and the second metal oxide particle are different metal oxides.

7 Claims, 3 Drawing Sheets

(51) Int. Cl.
*B05D 5/06* (2006.01)
*B05D 7/00* (2006.01)
*G02B 5/28* (2006.01)
*B32B 17/10* (2006.01)

(52) U.S. Cl.
CPC .. *B32B 17/10018* (2013.01); *B32B 17/10761* (2013.01); *B32B 17/10788* (2013.01); *G02B 5/282* (2013.01); *G02B 5/287* (2013.01); *B05D 2401/20* (2013.01); *B05D 2601/02* (2013.01)

(56) References Cited

U.S. PATENT DOCUMENTS

| | | | |
|---|---|---|---|
| 2005/0280890 A1* | 12/2005 | Otani et al. | 359/359 |
| 2006/0078754 A1* | 4/2006 | Murakami | B29C 47/0021 428/532 |
| 2006/0158738 A1* | 7/2006 | Nakamura et al. | 359/586 |
| 2008/0220246 A1* | 9/2008 | Suzuki et al. | 428/332 |
| 2008/0259439 A1* | 10/2008 | Shiraishi | 359/360 |
| 2009/0161219 A1* | 6/2009 | Ishizawa et al. | 359/586 |
| 2009/0237782 A1 | 9/2009 | Takamatsu et al. | |
| 2009/0290219 A1* | 11/2009 | Terayama | 359/586 |
| 2010/0208349 A1 | 8/2010 | Beer et al. | |
| 2010/0218703 A1* | 9/2010 | Bujard et al. | 106/438 |
| 2010/0226004 A1* | 9/2010 | Nishimoto et al. | 359/359 |

FOREIGN PATENT DOCUMENTS

| | | |
|---|---|---|
| JP | 2007-148330 A | 6/2007 |
| JP | 2009-86659 A | 4/2009 |
| JP | 2009-544491 | 12/2009 |
| JP | 2010-204346 | 9/2010 |

OTHER PUBLICATIONS

International Search Report of PCT/JP2011/074663 dated Jan. 31, 2012.
Office Action dated Apr. 7, 2015 from the corresponding Japanese Patent Application No. 2012-540903.
English translation of the Office Action dated Apr. 7, 2015 from the corresponding Japanese Patent Application No. 2012-540903.
Chinese Office Action, Application No. 201180051207.6. Date of Notification: Nov. 3, 2014 and English translation thereof (14 pages).

* cited by examiner

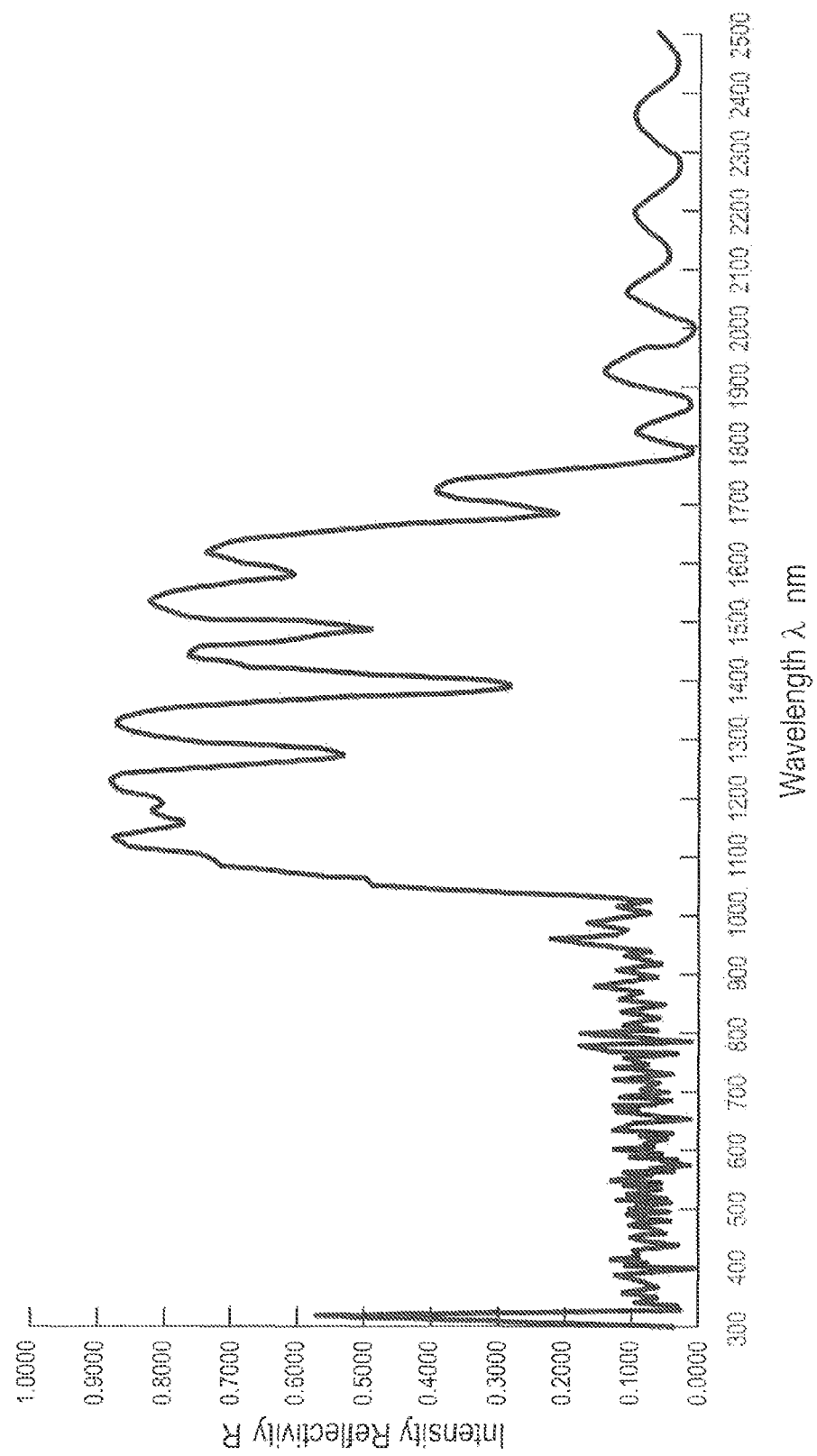

NEAR-INFRARED REFLECTIVE FILM, METHOD FOR PRODUCING SAME, AND NEAR-INFRARED REFLECTOR PROVIDED WITH NEAR-INFRARED REFLECTIVE FILM

CROSS REFERENCE TO RELATED APPLICATION

This Application is a 371 of PCT/JP2011/074663 filed on Oct. 26, 2011, which claimed the priority of Japanese Patent Application No. 2010-240511 filed on Oct. 27, 2010, and Japanese Patent Application No. 2010-274489 filed on Dec. 9, 2010, all applications are incorporated herein by reference in their entirety.

TECHNICAL FIELD

The present invention relates to a near-infrared reflective film. More particularly, the present invention relates to a near-infrared reflective film that is low-cost, that can have a large area, in which, in the optical properties, interference unevenness is particularly small, and which has excellent film physical properties.

BACKGROUND ART

An energy-saving technique attracts attention in which a temperature rise due to penetration of heat radiant energy of sunlight through a window glass into a room is curbed to minimize electrical energy for cooling.

In general, a laminated film in which a high refractive layer and a low refractive layer are alternately laminated adjusting respective optical film thicknesses has the property of selectively reflecting light or a specific wavelength. The use of a laminated film which transmits a visible light and has a selective reflectivity in which a near-infrared ray is selectively reflected, as a heat ray shield film used for windows or members for vehicles, is thus being attempted.

A near-infrared reflective film in which layers having different refractive indices, are alternately laminated is conventionally produced by a variety of methods. A method in which a dry film-forming method, such as vapor deposition or sputtering is used (see Patent Document 1), a method in which a UV-curable resin is used (see Patent Document 2) and a method in which a polymer resin is melt-extruded to obtain multiple layers (see Patent Document 3) are disclosed.

PRIOR ART DOCUMENTS

Patent Documents

Patent Document 1: Japanese Unexamined Patent Application Publication No. 2007-148330
Patent Document 2: Japanese Unexamined Patent Application Publication No. 2004-123766
Patent Document 3: Japanese Unexamined Patent Application Publication (Translation of PCT Application) No. 2004-303402

DISCLOSURE OF THE INVENTION

However, since, in any of these methods, the interface of the high refractive layer and the low refractive layer that are alternately laminated is clearly divided, interference unevenness (iridescent unevenness) due to local difference of the film thicknesses is likely to occur when curved surface machining is performed.

Accordingly an object of the present invention is to obtain a near-infrared reflective film that is low-cost, that can be produced with a large area, in which, in the optical properties, interference unevenness is particularly small, and which has excellent film physical properties.

The above-mentioned object of the present invention is attained by the following means.

(1) A near-infrared reflective film composed of a lamination unit comprising:
a high refractive layer containing a first metal oxide particle and a first water-soluble polymer, a low refractive layer containing a second metal oxide particle and a second water-soluble polymer and
a mixed layer located between line high refractive layer and the low refractive layer and which contains the first metal oxide particle, the second metal oxide particle and a third water-soluble polymer, wherein the refractive index of low refractive layer is smaller than the refractive index of the high refractive layer by 0.1 or more, and
the first metal oxide particle and the second metal oxide particle have different metal oxides.

(2) The near-infrared reflective film according to the item (1), wherein the thickness of the mixed layer is 5 to 50% of a film thickness of a neighboring layer that contains only the metal oxide particle of one of the first metal oxide particle or the second metal oxide particle, where 75% or more of the maximum content of the metal oxide is contained.

(3) The near-infrared reflective film according to the item (1) or (2), wherein, in the mixed layer, the ratio of the first metal oxide particle and the second metal oxide particle continuously varies.

(4) The near-infrared reflective film according to any one of the items (1) to (3), wherein the mixed layer is provided by simultaneous multiple layer coating of coating liquids which constitute the high refractive layer and the low refractive layer.

(5) The near-infrared reflective film according to any one of the items (1) to (4), wherein, in the high refractive layer or the low refractive layer, the mass ratio of the water-soluble polymer and the metal oxide particle (the mass of the water-soluble polymer/the mass of the metal oxide particle) is in a range of 0.3 to 10.

(6) The near-infrared reflective film according to any one of the items (1) to (5), wherein the lamination unit is constituted by laminating a plurality of high refractive layers and low refractive layers having different optical film thicknesses.

(7) A near-infrared reflector characterized in that the near-infrared reflective film according to any one of the items (1) to (6) is provided on at least one side of a substrate.

(8) A method of producing a near-infrared reflective film comprising forming two layers having different refractive indices, and a mixed layer located between the two layers having different refractive indices and in which the ratio of the different metal oxide particles continuously varies by simultaneous multiple layer coating of a first coating liquid containing a first water-soluble polymer and a first metal oxide particle and a second coating liquid containing a second water-soluble polymer and a second metal oxide particle.

(9) The near-infrared reflective film according to the item (8), wherein time from the simultaneous multiple layer coating of the first coating liquid and the second coating liquid to setting thereof is 5 minutes or less.

By the present invention, a near-infrared reflective film which can be produced in a low cost, has an excellent infrared reflecting power, has small interference unevenness when curved surface machining is performed, and has excellent film physical properties is obtained.

BRIEF DESCRIPTION OF THE DRAWINGS

FIG. 3 is a diagram illustrating one example of reflective properties of an infrared reflective film of the present invention.

MODES FOR CARRYING OUT THE INVENTION

In accordance with one embodiment of the present invention, there is provided a near-infrared reflective film composed of lamination unit comprising:

a high refractive layer containing a first metal oxide particle and a first water-soluble polymer, a low refractive layer containing a second metal oxide particle and a second water-soluble polymer and a mixed layer located between the high refractive layer and the low refractive layer and which contains the first metal oxide particle, the second metal oxide particle and a third water-soluble polymer, wherein the refractive index of the low refractive layer is smaller than the refractive index of the high refractive layer by 0.1 or more, and the first metal oxide particle and the second metal oxide particle have different metal oxides.

Namely, in the present invention, a near-infrared ray reflective film comprising a lamination unit of a high refractive layer and a low refractive layer, each containing a metal oxide to particle and a water-soluble polymer and the difference of the refractive indices of the layers being 0.1 or more is characterized in that the high refractive layer and the low refractive layer contain different metal oxide particles (i.e., metal oxide particles of different types with different refractive indices), respectively (first metal oxide particle, second metal oxide particle), and, between both the layers, there exists a region (mixed layer) where the different (different types of) metal oxide particles that both the layers contain are mixed.

First, with reference to the accompanying Drawings, a basic structure of a near-infrared reflective film of the embodiment will be explained. However, the present invention is not limited solely to the following embodiments. The dimensional ratios of the Drawings are exaggerated for the convenience of explanation, and may be different from the actual ratios.

Figure 1:
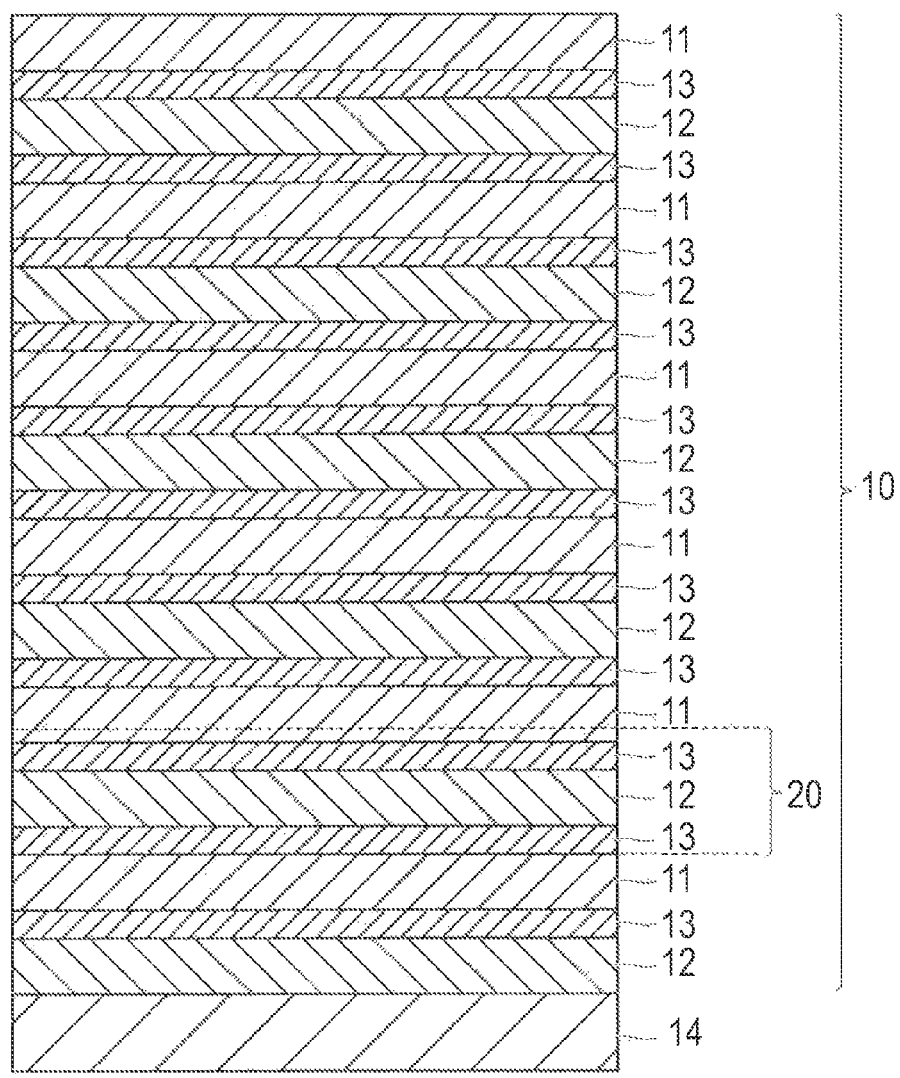
FIG. 1 illustrates a schematic diagram of basic structure of a near-infrared reflective film which is one embodiment of the present invention.

FIG. 1 is a schematic diagram of a basic structure of a near-infrared reflective film (hereinafter, also simply referred to as a "film") which is one embodiment of the present invention.

As illustrated in FIG. 1, a film 1 of the embodiment comprises a lamination unit 10. The lamination unit 10 is normally formed on a film support 14. Namely, the film 1 comprises the lamination unit 10 and the film support 14. The lamination unit 10 comprises a low refractive layer 12, a high refractive layer 11 and a mixed layer 13 located between the low refractive layer 12 and the high refractive layer 11.

In the embodiment illustrated in FIG. 1, two layers (the low refractive layer 12, the high refractive layer 11) having different refractive indices each other are alternately laminated and the mixed layer 13 is arranged between the two layers. It is noted that a film 1 is not limited to such an embodiment, and may be an embodiment in which three or more types of layers having different refractive indices 3 are laminated.

In the embodiment illustrated in FIG. 1, six laminated bodies of low refractive layer 12/mixed layer 13/high refractive layer 11 are laminated through the mixed layers 13 to constitute a lamination unit 10. It is noted that the lamination unit 10 of the present invention may be any unit as long as at least one laminated body of low refractive layer 12/mixed layer 13/high refractive layer 11 is contained, and may be constituted by only three layers of low refractive layer 12/mixed layer 13/high refractive layer 11, or may be constituted by laminating two to five, or seven or more laminated bodies of low refractive layer 12/mixed layer 13/high refractive layer 11.

Although, in the embodiment, all the low refractive layers 12 and the high refractive layers 11 are laminated through the mixed layers 13, the lamination unit 10 may comprise at least one mixed layer 13 and may have a portion where the low refractive layer 12 and the high refractive layer 11 are directly adjacent to each other.

In the embodiment, on the two outermost layers of the lamination unit 10, the low refractive layer 12 and the high refractive layer 13 are arranged respectively. It is noted that, the two outermost layer of the lamination unit 10 may be the same layers; namely, both the two outermost layers may be the low refractive layers 12 or the high refractive layers 11. In this case, on the top surface of the low refractive layer 12 or the high refractive layer 11 positioned at the outermost layer of the laminated body in which low refractive layer 12/mixed layer 13/high refractive layer 11 are laminated, the high refractive layer 11 or the low refractive layer 12 may be further laminated. It is noted that one outermost layer of the lamination unit 10 adjacent to the film support 14 is preferably the low refractive layer 12, and more preferably, the other outermost layer of the lamination unit 10 not adjacent to the film support 14 is also the low refractive layer 12.

In the following, each component of the present invention will be described in detail.

[Near-Infrared Reflective Film]

The near-infrared reflective film of the present invention comprises a multi-layer film (lamination unit 10) in which films with different refractive indices respectively (low refractive layer 12, high refractive layer 11) are laminated on a polymer film, and comprises a region where the transmittance in the visible light region according to JIS R3106-1998 is 50% or higher and the reflectivity is higher than 40% in the wavelength region of 900 nm to 1400 nm. The multilayer film (lamination unit 10) comprises the mixed layer 13 containing the first metal oxide particle and the second metal oxide particle between the high refractive layer 11 and the low refractive layer 12.

(Film Support)

As a film support 14 used for the present invention, a variety of resin films can be employed, and a polyolefin film (polyethylene, polypropylene or the like), a polyester film (polyethylene terephthalate, polyethylene naphthalate or the like), polyvinyl chloride, cellulose triacetate or the like can be employed. Preferably, polyester film can be employed.

The polyester film (hereinafter, referred to as "polyester") is not particularly limited, and is preferably a polyester comprising a dicarboxylic acid component and a diol component as main components, and having film formability. Examples of the dicarboxylic acid component which is the main component include terephthalic acid, isophthalic acid, phthalic acid, 2,6-naphthalene dicarboxylic acid, 2,7-naphthalene dicarboxylic acid, diphenylsulfone dicarboxylic acid, diphenyl ether dicarboxylic acid, diphenylethane dicarboxylic acid, cyclohexane dicarboxylic acid, diphenyl dicarboxylic acid, diphenyl thioether dicarboxylic acid, diphenyl ketone dicarboxylic acid, phenylindane dicarboxylic acid. Examples of the diol component include ethylene glycol, propylene glycol, tetramethylene glycol, cyclohexanedimethanol, 2,2-bis(4-hydroxyphenyl)propane, 2,2-bis(4-hydroxyethoxy phenyl)propane, bis(4-hydroxyphenyl)sulfone, bisphenol fluorene dihydroxy ethyl ether, diethylene glycol, neopentyl glycol, hydroquinone, cyclohexane diol. Among the polyesters comprising the above-mentioned component as the main component, from the viewpoint of transparency, mechanical strength, dimensional stability or the like, a polymer comprising terephthalic acid or 2,6-naphthalene dicarboxylic acid as the dicarboxylic acid component and comprising ethylene glycol, or 1,4-cyclohexanedimethanol as the diol component is preferred. Among these, a polymer comprising polyethylene terephthalate or polyethylene naphthalate as the main component, a copolymer polyester composed of terephthalic acid, 2,6-naphthalene dicarboxylic acid and ethylene glycol, and a polyester comprising a mixture of two or more types of these polyesters as the main component are preferred.

The thickness of the film support used in the present invention is preferably 10 to 300 µm, and particularly 20 to 150 µm. The film support of the present invention may be the one obtained by combining two sheets; in this case, the types thereof, may be the same or different.

(High Refractive Layer, Low Refractive Layer)

The high refractive layer 11 is constituted by containing the first metal oxide particle and the first water-soluble polymer; the low refractive layer 12 is constituted by containing the second metal oxide particle and the second water-soluble polymer. The first metal oxide particle and the second metal oxide particle have different metal oxides. Namely, the film 1 contains different metal oxide particles in the high refractive layer and the low refractive layer, respectively. Accordingly, the high refractive layer refers to a layer containing the first metal oxide particle and containing substantially no second metal oxide particle; the low refractive layer refers to a layer containing the second metal oxide particle and containing substantially no first metal oxide particle. The high refractive layer preferably contains no second metal oxide particle, but can contain the second metal oxide particle as long as the effects of the present invention are not compromised. In the same manner, the low refractive layer preferably contains no first metal oxide particle, but can contain the first metal oxide particle as long as the effects of the present invention are not compromised.

[Refractive Index Difference]

In the present invention, the refractive index difference of adjacent two layers is at least 0.1 or more, preferably 0.2 or more, more preferably 0.3 or more, and still more preferably 0.45 or more. The upper limit thereof is not particularly restricted and usually 1.4 or less.

In the present invention, there exists the mixed layer 13 between the high refractive layer 11 and the low refractive layer 12. The refractive index difference between the high refractive layer and the low refractive layer which are adjacent to each other refers to the refractive index difference between the high refractive layer and the low refractive layer which are adjacent to each other through the mixed layer 13, i.e., the difference between the refractive index of the high refractive layer (the maximum refractive index point of the high refractive layer) and the refractive index of the low refractive layer (the minimum refractive index point of the low refractive layer).

In the near-infrared reflective film of the present invention, the refractive index of the high refractive layer is preferably 1.70 to 2.30, and more preferably 1.80 to 2.20. The refractive index of the low refractive layer is preferably 1.10 to 1.60, and more preferably 1.30 to 1.55.

The refractive indices of the high refractive layer and the low refractive layer can be controlled by adjusting the types or contents of the first metal oxide particle and the second metal oxide particle. As described in the following Examples, the refractive indices of the high refractive layer and the low refractive layer can be determined by producing samples of single layer coatings of the high refractive layer and the low refractive layer, and measuring the visible light reflectivity of the samples using a spectrophotometer.

Since reflection at the layer interface of adjacent layers depends on the refractive index difference between layers (i.e., the refractive index of the high refractive layer 11 and the low refractive layer 12), the larger the refractive index difference, the higher the reflectivity. In a single layer film, by making the optical path difference between the reflected light on the layer surface and the reflected light on the layer bottom in the relationship represented by $n \cdot d = \text{wavelength}/4$, the reflected lights can be controlled such that they intensify each other, thereby increasing the reflectivity. Here, n represents a refractive index, d a physical film thickness and n·d an optical film thickness. By using the optical path difference, reflection can be controlled. In the wavelength of 900 nm to 1400 nm, by using this relationship, and by controlling the film thickness of each layer, transmittance of visible light and reflection of near-infrared light are controlled. In other words, by the refractive index of each layer, the film thickness of each layer and the way how each layer is laminated, the reflectivity in a specific wavelength region is increased.

As mentioned below, in cases where a lamination unit is produced by simultaneous multiple layer coating of the high refractive layer and the low refractive layer, the interface of the high refractive layer and the low refractive layer becomes a mixed region (mixed layer), which may obscure the position of the layer interface of the high refractive layer 11 and the low refractive layer 12. Even in such cases where there is no sharp interface between the high refractive layer 11 and the low refractive layer 12, by appropriately setting the refractive index of each layer, the film thickness of each layer and the way how each layer is laminated in the high refractive layer 11, the low refractive layer 12 and the mixed layer, a control of reflection properties as above becomes possible.

The infrared region of the incident spectrum of a direct solar radiation involves a room temperature increase; therefore, blocking the radiation in the infrared region can inhibit the room temperature increase. With reference to the cumulative energy ratio from the shortest wavelength (760 nm) in the infrared, region to the longest wavelength 3200 nm based on the weighting factors according to the Japanese Industrial Standard JIS R3106, the cumulative energies from 760 nm to certain wavelengths, taking the total energy in the total infrared region from wavelength 760 nm to the longest wavelength 3200 nm as 100, show that the total energy from 760 to 1300 nm accounts for about 75% of that in the total infrared region. Accordingly, by blocking a direct solar radiation in the wavelength region as long as 1300 nm, the effect of energy-saving by heat ray blocking can be most efficiently obtained.

When the maximum peak value of the reflectivity in the infrared region (760 to 1300 nm) is about 80% or higher, sensible temperature decrease is observed by a sensory evaluation. For example, blocking by setting the maximum peak value of the reflectivity in the infrared region to about 80% made a clear difference in a sensible temperature at a window facing southeast in the morning in August.

The determination, using an optical simulation (FTG Software Associates Film DESIGN version 2.23.3700), of a multi-layer film structure which is needed to fulfill such a function reveals that excellent properties can be obtained when six layers in total of high refractive layers and low refractive layers are laminated by utilizing a high refractive layer having a refractive index of 1.9 or higher, preferably 2.0 or higher. For example, with reference to the result of model simulation of 8-layer-alternate-lamination of high refractive layers and low refractive layers (refractive index=1.35), the reflectivity is less than 70% when the refractive index of the high refractive layer is 1.8, while the reflectivity is about 80% when the refractive index of the high refractive layer is 1.9. In a model in which high refractive layers (refractive index=2.2) and low refractive layers (refractive index=1.35) are alternately laminated, the reflectivity is less than 60% when the number of the layers is four, while the reflectivity is about 80% when the number of the layers is 6.

The wavelength of a reflected light can be controlled by changing the optical film thickness in such a manner. Therefore, by employing, in a unit of alternate lamination of the high refractive layer and the low refractive layer, a constitution in which a plurality of sets of the units of high refractive layers and low refractive layers having different optical film thicknesses, an infrared reflective film in which light in the near-infrared region as well as light in the infrared region or in a part of the visible light region is reflected can be obtained. Namely, in one embodiment of the present invention, the lamination unit is constituted by laminating a plurality of high refractive layers and low refractive layers having different optical film thicknesses, respectively. For example, by laminating three sets of laminated bodies having different optical film thicknesses, the infrared reflecting region becomes wide, thereby enhancing the sunlight blocking effect. The change in the optical film thickness may be caused by the change in the thickness of the coating of each layer. By this, the distance between the highest refractive index point and the lowest refractive index point is changed, as well as, the optical film thickness is changed.

(Mixed Layer)

The present invention is characterized by employing a basic structure composed of an alternately laminated body of the above-mentioned high refractive layer and low refractive layer, and at the same time by having the mixed layer (mixed region) 13 between the high refractive layer 11 and the low refractive layer 12. By this, for example, when curved surface machining is performed or like, interference unevenness (iridescent unevenness) or the like due to refractive index unevenness in the surface can be reduced.

The mixed layer 13 is constituted by containing the first metal oxide particle, the second metal oxide particle, and the third water-soluble polymer.

In the mixed region (mixed layer), the ratio of the different metal oxide fine particles (first metal oxide particle and second metal oxide particle) is preferably changed in a plurality of steps. Namely, the mixed layer can contain a plurality of layers having different ratios of the first metal oxide particle and the second metal oxide particle. By this, the ratio (concentration) of the first metal oxide particle and the ratio (concentration) of the second metal oxide particle can be increased in steps or decreased in the thickness direction of the mixed layer. More preferably, in the mixed layer (mixed region) where different metal oxide particles are mixed, the ratio of the metal oxide particles, i.e., the ratio of the first metal oxide particle and the second metal oxide particle continuously varies.

By providing a mixed layer in which the ratio of the metal oxide particles continuously varies between the high refractive layer and the low refractive layer, an inexpensive infrared reflective film in which higher order reflection in a wide range of infrared reflecting region and visible light region is suppressed, and further, durability against film separation or the like is improved, and an infrared reflector at least one surface of which is provided with the infrared reflective film can be obtained.

Conventionally, it is known that a film can be designed to reflect an infrared ray by alternately laminating layers having different refractive indices and adjusting the optical film thickness. However, only alternately laminating layers having different refractive indices results in high-order reflection in the visible light region, whereby a colored film may be obtained.

In order to prevent this, for example, in the case of constituting an infrared reflective film by an alternate lamination unit composed of a high refractive layer A (refractive index nA) and a low refractive layer C (refractive index nC), there is disclosed a laminated body of polymer film comprising an alternate lamination unit in which a layer B of a different refractive index which has the relationship of $nB=(nA \cdot nC)^{0.5}$, and the high refractive layer A and the low refractive layer C are alternately laminated in the order ABCB, and further, the ratio of the optical film thickness of each of the layers is set to be A: 1/3, B: 1/6, C: 1/3 (for example, Japanese Patent No. 3067863).

The present invention basically employs such a structure and is characterized in that a high refractive layer and a low refractive layer are nested, i.e., the abundances of a high refractive index material and a low refractive index material of which the respective layers are constituted are nested; a mixed region (mixed layer) in which the high refractive layer and the low refractive layer are mixed is provided between the high refractive index region and the low refractive index region.

A mixed layer in which the ratio of metal oxide particles continuously varies can be produced by the below-mentioned method of simultaneous multiple layer coating of coating liquids constituting the high refractive layer and the low refractive layer. When a lamination unit is produced by the simultaneous multiple layer coating of the high refractive layer and the low refractive layer, the interface of the high refractive layer and the low refractive layer becomes a mixed region (mixed layer).

When simultaneous multiple layer coating of the high refractive layer coating liquid and the low refractive layer coating liquid is performed, all the coating liquid components (the high refractive index material and the low refractive index material) mix in the time until the film is set. As the result, the high refractive index material (first metal oxide particle) and the low refractive index material (second metal oxide particle) are mixed, and nested to form a mixed region where the ratio thereof continuously varies.

Specifically, by forming an alternate lamination by simultaneous multiple layer coating using a high refractive layer coating liquid A (refractive index nA) and a low refractive layer coating liquid C (refractive index nC), a region, (corresponding to the layer B) where the refractive index continuously varies such that the average refractive index approximately fulfills the relationship: $nB=(nA \cdot nC)^{0.5}$ is formed in each of the regions where layers are mixed (mixed layer).

The profile of the refractive index of these mixed layers in the film thickness direction is preferably a continuous refractive index profile in a structure in which respective layers are mixed and the refractive indices alternately continuously vary such that the position where the refractive index has a value of $2/3 \times (nA-NC)+nC$ with respect to the maximum refractive index is in a range of 0.9/3 to 1.1/3 from the maximum refractive index point with respect to the width (layer thickness) from the maximum refractive index to the minimum refractive index; and the position where the refractive index has a value of $1/3 \times (nA-nC)+nC$ with respect to the minimum refractive index is in a range of 0.9/3 to 1.1/3 from the minimum refractive index point with respect to the width (layer thickness) from the maximum refractive index to the minimum refractive index.

Such continuous change in the refractive index corresponds to the alternately laminated structure. By a continuous and smooth change not a stepwise change in the refractive index, an infrared reflective film which can also suppress the reflection in the side-band region near the infrared reflection wavelength region is obtained. The refractive index profile of the mixed layer preferably represents a sine curve.

Accordingly, the lamination unit 10 is not the one which is obtained by clearly alternately laminating each of a layer B having an intermediate refractive index which approximately has the relationship of $nB=(nA \cdot nC)^{0.5}$, and a high refractive layer A and a low refractive layer C in the ABCB order as mentioned above, but is preferably a laminated body with a structure in which the refractive index of the mixed region (mixed layer) continuously varies from a high refractive layer (high refractive region) to a low refractive layer (low refractive region) by simultaneous multiple layer coating of a high refractive layer coating liquid and a low refractive layer coating liquid.

These constitutions according to the present invention can be obtained by simultaneous multiple layer coating of a high refractive layer coating liquid and a low refractive layer coating liquid. These constitutions are preferred since good productivity and large area production can be attained, as well as reflection due to a side-band can be reduced; coloring, due to a high order reflection is suppressed; and reduction of the visible light transmittance can be suppressed.

The refractive index profile of a lamination unit in which a mixed region (mixed layer) is formed by simultaneous multiple layer coating of the high refractive layer and the low refractive layer can be known by determining the metal oxide concentration profile of these laminated films in the film thickness direction. Namely, the refractive index can be converted by the composition from the metal oxide concentration profile in the film thickness direction of a laminated film.

The metal oxide concentration profile of the laminated film can be observed by etching on the surface in the depth direction by using a sputtering method, and by sputtering at a rate of 0.5 nm/min setting the outermost surface to 0 nm to measure the atom composition ratio of the film using XPS surface analyzer. Also, by cutting the laminated film and measuring the atom composition ratio on the cut surface thereof by XPS surface analyzer, the profile can be observed. In the mixed region, when the concentration of the metal oxide continuously varies, the interface thereof can be known by a tomography by an electron microscope (TEM).

The XPS surface analyzer is not particularly limited and any types can be used, and ESCALAB-200R manufactured by VG SCIENTIFIC LTD. was used. As the X-ray anode, Mg was used, and measurement is performed at the output of 600 W (accelerating voltage 15 kV, emission current 40 mA).

The thickness of the region (mixed layer) 13 in which different metal oxide particles (first metal oxide particle, second metal oxide particle) are mixed is preferably in the range of 5 to 50%, and more preferably 10 to 30% of the film thickness where there exists 75% or more of the maximum metal oxide content of the adjacent layer (high refractive layer 11 or low refractive layer 12) containing only one metal oxide particle of the first metal oxide particle or the second metal oxide particle. In order to obtain effect of reducing interference unevenness, the thickness of the mixed region is needed to be 5% or higher. In order to obtain sufficient near-infrared reflecting effect, the thickness is preferably 50% or less.

This will be explained with reference to FIG. 2.

Figure 2:
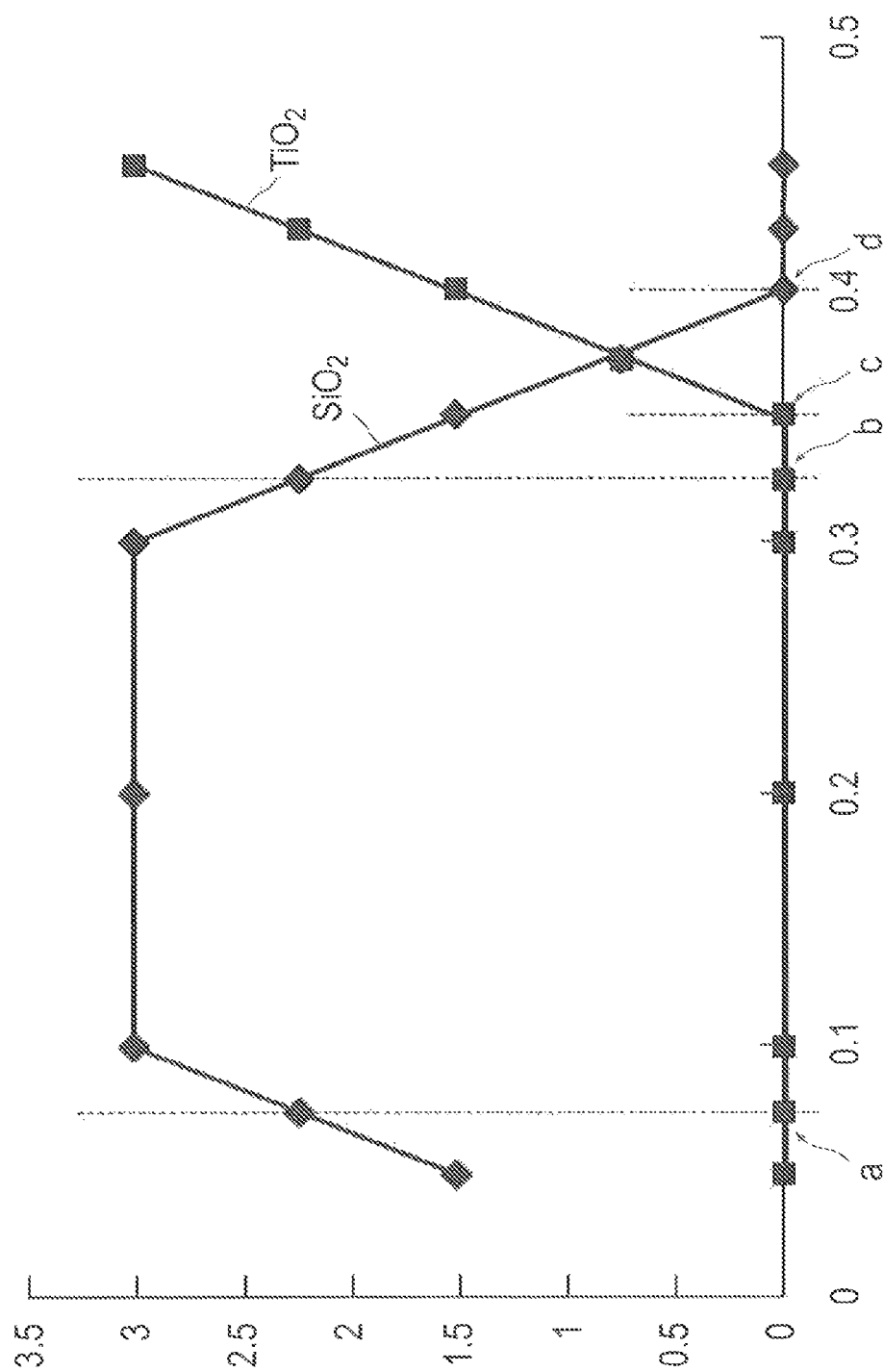
FIG. 2 is a graph illustrating the relationship between the metal oxide ratio and the film thickness in a mixed region composed of two kinds of particles that is present between two layers which are a silicon dioxide-containing layer and a titanium dioxide-containing layer.

FIG. 2 is a graph representing a model of the relationship between the number (amount) of the metal oxide particles (ordinate) and the film thickness (abscissa) for alternately laminated row refractive layer 12, a silicon dioxide-containing layer, high refractive layer 11, a titanium dioxide-containing layer and region where the silicon dioxide and the titanium dioxide present between both the layers (the ratio of the metal oxide particles continuously varies) are mixed. FIG. 2 represents a graph on which change in the number (amount) of the metal oxide particles in the thickness direction of region 20 in FIG. 1.

In FIG. 2, between the silicon dioxide-containing layer and the titanium dioxide-containing layer, there exists a mixed region of both silicon dioxide and titanium dioxide, which corresponds to between c and d, and between 0.35 and 0.4 in the film thickness (abscissa). The thickness thereof is 0.05.

As illustrated in FIG. 2, in the region where the film thickness (abscissa) is 0.1 to 0.3, the number of particles of one metal oxide (in this case, $SiO_2$) is 3, and the content of the metal oxide ($SiO_2$) in the silicon dioxide-containing layer is at its maximum. Namely, in FIG. 2, the maximum metal oxide content of the silicon dioxide-containing layer is 3, and the portions where the content of the metal oxide ($SiO_2$) in the silicon dioxide-containing layer is $3 \times 0.75=2.25$, i.e., 0.075(a) and 0.325(b) in the film thickness (abscissa) are the regions where the content of one metal oxide (in this case, $SiO_2$) is 75% of the maximum metal oxide content. Therefore, in this case, in the silicon dioxide-containing layer, the film thickness where 75% or more of the maximum metal oxide content exists is the film thickness between a and b in FIG. 2, i.e., between 0.075 and 0.325. At the portion of 0.35, although only one metal oxide (i.e., $SiO_2$) is contained, the portion is not the above-mentioned thickness since the content is less than 75%.

In this case, the film thickness where 75% or more of the maximum (content of the metal oxide (in this case, silicon dioxide) exists is therefore 0.25.

As mentioned above, since for the thickness (between c and d in FIG. 2) of the mixed region of both the silicon dioxide and the titanium dioxide is 0.05, in this case, the film thickness 0.25 where 75% or more of the maximum metal oxide content exists, ratio thereof is 20%.

The present invention is characterized by comprising alternately laminated high refractive layers and low refractive layers, as well as a mixed region (mixed layer) therebetween.

[Metal Oxide Particle]

The metal oxide particles of the present invention (first metal oxide particle, second metal oxide particle) are used when the above-mentioned low refractive layer, high refractive layer or a mixed layer is constituted. Examples of a metal oxide used in the object of the above-mentioned include titanium dioxide, zirconium, oxide, zinc oxide, synthetic amorphous silica, colloidal silica, alumina, colloidal alumina, lead titanate, minimum, chrome yellow, zinc yellow, chromium oxide, ferric oxide, iron black, copper oxide, magnesium oxide, magnesium hydroxide, strontium titanate, yttrium oxide, niobium oxide, europium oxide, lanthanum oxide, zircon and tin oxide. Among these, as the metal oxide particle, a solid fine particle selected from titanium dioxide, silicon dioxide and alumina is preferably employed. The alumina or alumina hydrate may be crystalline or amorphous, and any shapes such as unshaped particles, spherical particles or acicular particles may be employed.

One of the first metal oxide particle or the second metal oxide particle may be used alone, and two or more thereof may be used in combination. The first metal oxide particle contained in the high refractive layer and the second metal oxide particle contained in the low refractive layer need to have a different metal oxide. It is satisfactory, however, that, when the first metal oxide particle and/or the second metal oxide particle contain two or more metal oxides, only at least one metal oxide in the one particle is different from at least one metal oxide in the other particle. Namely, for example, an embodiment in which the first metal oxide particle contains titanium dioxide and alumina and in which the second metal oxide particle contains silicon dioxide and alumina is also within the present invention.

The maximum metal oxide content of the high refractive layer or the low refractive layer when the first metal oxide particle and/or the second metal oxide particle contains two or more metal oxides is calculated from the total amount of the metal oxide contained in the high refractive layer or the low refractive layer.

The average particle size of the metal oxide particle is determined as a simple average (number average) by observing a particle per se or a particle appealed on the cross section or one surface of the refraction layer (low refractive layer, high refractive layer) with an electron microscope to measure the particle size of any of 1,000 particles. The sizes of the respective particles are represented in diameter when assuming an equivalent circle on the projected area thereof.

The metal oxide particle has a particle size of 100 nm or less, 4 to 50 nm, and more preferably 4 to 30 nm.

The metal oxide fine particle is preferably in a state in which a fine particle dispersion before mixed with the water-soluble polymer is dispersed to primary particles.

The types said the content of metal oxide particle (first metal oxide particle, second metal oxide particle) may be appropriately determined such that a desired refractive indices of the refractive layer and the low refractive layer are obtained.

Among others, as the first metal oxide particle contained in the high refractive layer, $TiO_2$, $ZnO$ and $ZrO_2$ are preferred, said from the viewpoint of the stability of the below-mentioned composition containing a metal oxide particle for forming the high refractive layer, $TiO_2$ (titanium dioxide) sol is more preferred. Rutile-type rather than anatase-type of $TiO_2$ is preferred since the weather resistance of the high refractive layer or the adjacent layers is high due to a low catalytic activity of the rutile-type $TiO_2$, and the refractive index is high.

[Titanium Dioxide]

A Method of Producing Titanium Dioxide Sol

The first process in a method of producing rutile-type fine particle titanium dioxide is a process (process 1) in which titanium dioxide hydrate is treated with at least one basic compound selected from the group consisting of hydroxide of alkali metal and hydroxide of alkaline-earth metal.

The titanium dioxide hydrate can be obtained by hydrolysis of a water-soluble titanium compound such as titanium sulfate or titanium chloride. The method of hydrolysis is not particularly limited and a known method may be applied. Among others, the one obtained by thermal hydrolysis of titanium sulfate is preferred.

The above-mentioned process (1) can be performed, for example, by adding the above-mentioned basic compound to an aqueous suspension of the above-mentioned titanium dioxide hydrate and treating (reacting) the resultant under a predetermined temperature condition for a predetermined time.

The method of making an aqueous suspension of the above-mentioned titanium dioxide hydrate is not particularly limited, and may be performed by adding the above-mentioned titanium dioxide hydrate to water followed by stirring. The concentration of the suspension is not particularly limited, and, for example, a concentration of 30 to 150 g/L of $TiO_2$ in the suspension is preferred. By making the concentration in the above-mentioned range, the reaction (treatment) can efficiently proceed.

The at least one basic compound selected from the group consisting of hydroxide of alkali metal and hydroxide of alkaline-earth metal used in the above-mentioned process (1) is not particularly limited, and examples thereof include sodium hydroxide, potassium hydroxide, magnesium hydroxide and calcium hydroxide. The amount of the above-mentioned basic compound added in the above-mentioned process (1) is preferably a concentration of 30 to 300 g/L with respect to the basic compound in the reaction (treatment) suspension.

The above-mentioned process (1) is preferably performed at a reaction (treatment) temperature of 60 to 120° C. The reaction (treatment) time varies depending on the reaction (treatment) temperature, and is preferably 2 to 10 hours. The reaction (treatment) is preferably performed by adding an aqueous solution of sodium hydroxide, potassium hydroxide, magnesium hydroxide or calcium hydroxide to a suspension of titanium dioxide hydrate. After the reaction (treatment), the reacted (treated) mixture is cooled, neutralized by an inorganic acid such as a hydrochloric acid as needed followed by filtration and washing, thereby obtaining fine particle titanium dioxide hydrate.

In the second process (process (2)), a compound obtained by the process (1) may be treated, with a carboxylic acid group containing compound and an inorganic acid. A method of treating a compound obtained in the above-mentioned process (1) in the production of the rutile-type fine particle titanium dioxide is a known method. The particle size thereof can be adjusted by using a carboxylic acid group containing compound in addition to or in place of the inorganic acid.

The above-mentioned carboxylic acid group containing compound is an organic compound having a —COOH group. The above-mentioned carboxylic acid group containing compound is preferably a polycarboxylic acid having two or more, more preferably, two to four carboxylic acid groups. Since the above-mentioned polycarboxylic acid has coordination ability to a metal atom, it is presumed that coagulation between fine particles is restrained by coordination and thus a rutile-type fine particle titanium dioxide can be obtained.

The above-mentioned carboxylic acid group containing compound is not particularly limited, and examples thereof include dicarboxylic acid such as oxalic acid, malonic acid, succinic acid, glutaric acid, adipic acid, propyl malonic acid and maleic acid; hydroxy polyvalent carboxylic acid such as malic acid, tartaric acid and citric acid; aromatic polycarboxylic acid such as phthalic acid, isophthalic acid, hemimellitic acid and trimellitic acid; and ethylenediaminetetraacetic acid. Two or more of these compounds may be used simultaneously in combination.

Whole or part of the above-mentioned carboxylic acid group containing compound may be a neutralized product of an organic compound having an —COOH group (for example, organic compound having —COONa group).

The above-mentioned inorganic acid is not particularly limited, end examples thereof include hydrochloric acid, sulfuric acid and nitric acid. The above-mentioned inorganic acid may be added such that the concentration thereof in the reacted (treated) solution is 0.5 to 2.5 mole/l, more preferably 0.8 to 1.4 mole/l.

In the above-mentioned process (2), the compound obtained in the above-mentioned process (1) is preferably suspended in pure water and, as needed, heated under stirring. The addition of a carboxylic acid group containing compound and an inorganic acid may be at the same time or sequentially, and a sequential addition thereof is preferred.

In cases where both the carboxylic acid group containing compound and the inorganic acid are added, the addition thereof may be such that the inorganic acid is added after the addition of the carboxylic acid group containing compound or may be such that the carboxylic acid group containing compound is added after the addition of the inorganic acid.

Examples of such a method include a method (method 1) in which, to a suspension of a compound obtained in the above-mentioned process (1), a carboxyl group containing compound is added, heating is started and an inorganic acid is added when the liquid temperature is 60° C. or higher and preferably 90° C. or higher, followed by stirring for preferably 15 minutes to 5 hours, more preferably 2 to 3 hours while maintaining the liquid temperature; and a method (method 2) a which a suspension of a compound obtained in the above-mentioned process (1) is heated, and an inorganic acid is added when the liquid temperature is 60° C. or higher and preferably 90° C. or higher, then a carboxylic acid group containing compound is added 10 to 15 minutes after the addition of the inorganic acid, followed by stirring for preferably 15 minutes to 5 hours, more preferably 2 to 3 hours while maintaining the liquid temperature. By using the methods, a suitable fine particle rutile-type titanium dioxide can be obtained.

In cases where the above-mentioned process (2) is performed using the above-mentioned method 1, the above-mentioned carboxylic acid group containing compound is preferably used in an amount of 0.25 to 1.5 mole %, and more preferably in an amount of 0.4 to 0.8 mole % with respect to 100 mole % of $TiO_2$. When the amount of the carboxylic acid group containing compound added is less than 0.25 mole %, particle growth proceeds, by which a particle with a desired particle size may not be obtained; when the amount of the carboxylic acid group containing compound added is more than 1.5 mole %, rutilization of the particle does not proceed and an anatase particle may be generated.

In cases where the above-mentioned process (2) is performed by using the above-mentioned method 2, the above-mentioned carboxylic acid group containing compound is preferably used in an amount of 1.6 to 4.0 mole %, and more preferably in an amount of 2.0 to 2.4 mole % with respect to 100 mole % of $TiO_2$.

When the amount of the carboxylic acid group containing compound added is less than 1.6 mole %, particle growth proceeds, by which a particle with a desired particle size may not be obtained; when the amount of the carboxylic acid group containing compound added is more than 4.0 mole %, rutilization of the particle does not proceed and an anatase particle may be generated. Therefore, even when the amount of the carboxylic acid, group containing compound added is more than 4.0 mole %, the favorable effect is not obtained, which is economically disadvantageous. When the addition of the above-mentioned carboxylic acid group containing compound is performed in less than 10 minutes from the addition of the inorganic acid, rutilization does not proceed and an anatase particle may be generated; when the addition of the above-mentioned carboxylic acid group containing compound is performed over 15 minutes after the addition of the inorganic acid, the particle growth proceeds too much and a particle with a desired particle size may not be obtained.

In the above-mentioned process (2), it is preferred that cooling is performed after the completion of reaction (treatment), and further neutralization is performed to obtain a pH of 5.0 to 10.0. The above-mentioned neutralization can be performed by alkaline compounds such as aqueous sodium hydroxide and ammonia water. After the neutralization, by performing filtration and washing, an desired rutile-type fine particle titanium dioxide can be isolated.

As the method of producing titanium dioxide fine particles, a known method described such as in "Titanium Oxide—Physical Properties and Applied Technology" (Manabu Kiyono pp 255 to 258 (2000) GIHODO SHUPPAN Co., Ltd.) can be used.

A preferred primary particle diameter of the titanium dioxide fine particle is preferably 5 nm to 35 nm, and more preferably 6 nm to 10 nm.

For the low refractive layer, silicon dioxide (silica) is preferably used as the second metal oxide particle, and acidic colloidal silica sol is particularly preferably used.

[Silicon Dioxide]

As silicon dioxide (silica) which can be used in the present invention, silica, colloidal silica synthesized in a normal wet method, or gas phase method synthetic silica (gas phase method fine particle silica) or the like is preferably used. In the present invention, as a particularly preferably used fine particle silica, colloidal silica or gas phase method synthetic fine particle silica (gas phase method fine particle silica) is preferably employed.

In the case of the above-mentioned gas phase method fine particle silica, the average particle size of the primary particle of a metal oxide fine particle dispersed in a primary particle state (particle size in dispersion state before coating) is preferably 100 nm or less, more preferably 4 to 50 nm and most preferably 4 to 20 nm.

As a gas phase method synthetic silica (gas phase method fine particle silica) having an average particle size of primary particle of 4 to 20 nm, for example, AEROSIL manufactured by Nippon Aerosil Co., Ltd. is commercially available. The gas phase method fine particle silica can be dispersed to primary particle relatively easily by suctioning and dispersing the fine particle silica easily in water by, for example, Jet-Stream Inductor Mixer manufactured by Mitamura Riken Kogyo Inc.

The colloidal silica preferably used in the present invention is obtained by heat-maturing a silica sol obtained by decomposing sodium silicate by an acid or passing sodium silicate through an ion-exchange resin. The use of such a colloidal silica for an inkjet paper is described in, for example, Japanese Patent Application Laid-Open No. SHO 57-14091, Japanese Patent Application Laid-Open No. SHO 60-219083, Japanese Patent Application Laid-Open No. SHO 60-219084, Japanese Patent Application Laid-Open No. SHO 61-20792, Japanese Patent Application Laid-Open No. SHO 61-188183, Japanese Patent Application Laid-Open No. SHO 63-17807, Japanese Patent Application Laid-Open No. HEI 4-93284, Japanese Patent Application Laid-Open No. HEI 5-278324, Japanese Patent Application Laid-Open No. HEI 6-92011, Japanese Patent Application Laid-Open No. HEI 6-183134, Japanese Patent Application Laid-Open No. HEI 6-297830, Japanese Patent Application Laid-Open No. HEI 7-81214, Japanese Patent Application Laid-Open No. HEI 7-101142, Japanese Patent Application Laid-Open No. HEI 7-179020, Japanese Patent Application Laid-Open No. HEI 7-137431 and WO94/26530.

The colloidal silica preferably has an average particle size of normally 5 to 100 nm, and particularly preferably 5 to 30 nm.

The gas phase method synthetic silica (gas phase method fine particle silica) and colloidal silica may be cationically modified, and may be those treated with Al, Ca, Mg, Ba and the like.

In the present invention, colloidal silica composite emulsion may also be used as a metal oxide in a low refractive layer. A colloidal silica composite emulsion preferably used in the present invention has polymer or copolymer as a main component in the center portion of the particle, and is obtained by polymerizing a monomer having an ethylenically unsaturated bond by a conventionally known emulsion polymerization method under the presence of a colloidal silica described in Japanese Patent Application Laid-Open No. SHO 59-71316 and Japanese Patent Application Laid-Open No. SHO 60-127371. The particle size of colloidal silica applied to the complex emulsion is preferably less than 40 nm.

Examples of a colloidal silica used for the preparation of the composite emulsion usually include those having a primary particle of 2 to 100 μm. Examples of the ethylenic monomer include an alkyl group, an aryl group having 1 to 18 carbon atoms, a (meth)acrylic acid ester having an allyl group, styrene, α-methyl styrene, vinyltoluene, acrylonitrile, vinyl chloride, vinylidene chloride, vinyl acetate, vinyl propionate, acrylamide, N-methylolacrylamide, ethylene and butadiene, which are known materials in latex industry. As needed, vinylsilanes such as vinyltrimethoxysilane, vinyltriethoxysilane and γ-methacryloxy propyl trimethoxysilane for better compatibility with colloidal silica; and anionic monomers such as (meth)acrylic acid, maleic acid, maleic acid anhydride, fumaric acid and crotonic acid for dispersion stability of emulsion are used as an auxiliary agent. Two or more types of ethylenic monomers can be used in combination as needed.

The solid content ratio of ethylenic monomer/colloidal silica in emulsion polymerization is preferably 100/1 to 200.

Examples of more preferred colloidal silica composite emulsion used in the present invention include those having glass-transition point of −30 to 30° C.

Examples thereof preferred in view of the composition include ethylenic monomer such as acrylic acid ester and methacrylic acid ester, and particularly preferably include copolymer of (meth)acrylic acid ester and styrene, copolymer of (meth)acrylic acid alkyl ester and (meth)acrylic acid aralkyl ester, and copolymer of (meth)acrylic acid alkyl ester and (meth)acrylic acid aryl ester.

Examples of an emulsifier used in emulsion polymerization include alkyl allyl polyether sulfonic acid sodium salt, laurylsulfonic acid sodium salt, alkyl benzene sulfonic acid sodium salt, polyoxy ethylene nonylphenyl ether nitrate sodium salt, alkyl allyl sulfosuccinate sodium salt, sulfopropyl maleic acid monoalkyl ester sodium salt.

A preferred particle size is 10 nm or less in primary particle and 30 nm or less in secondary particle, which results in small haze and an excellent visible light transmittance.

[Water-Soluble Polymer]

For refraction layers (low refractive layer 12, high refractive layer 11) and a mixed region (mixed layer 13) according to the present invention, at least one water-soluble polymer (first water-soluble polymer, second water-soluble polymer, third water-soluble polymer) selected from the group consisting of synthetic polymer such as polyvinyl alcohol; gelatin; polysaccharide thickener; and inorganic polymer can be used as a binder. Among others, in cases where a film is formed by the below-mentioned simultaneous multiple layer, a gelatin, among others, is preferably used as a water-soluble polymer (first water-soluble polymer, second water-soluble polymer, third water-soluble polymer). The first water-soluble polymer contained in the high refractive layer 11, the second water-soluble polymer contained in the low refractive layer 12, and the third water-soluble polymer contained in the mixed layer 13 are optionally the same or different.

Herein, a "water-soluble polymer" means the one whose mass of insoluble matter separated by filtration with G2 glass filter (maximum pore 40 to 50 μm) is 50 mass % or less of the water-soluble polymer added when it is dissolved at a concentration of 0.5 mass % in water at a temperature at which it is most dissolved.

(Synthetic Polymer)

Examples of a synthetic polymer which is applicable to the present invention include polyvinyl alcohols; polyvinylpyrrolidones; acrylic resin such as polyacrylic acid, acrylic acid-acrylonitrile copolymer, acrylic acid potassium-acrylonitrile copolymer, vinyl acetate-acrylic acid ester copolymer, or acrylic acid-acrylic acid ester, copolymer; styrene acrylic acid resin such as styrene-acrylic acid copolymer, styrene-methacrylic acid copolymer, styrene-methacrylic acid-acrylic acid ester copolymer, styrene-α-methyl styrene-acrylic acid copolymer, or styrene-α-methyl styrene-acrylic acid-acrylic acid ester copolymer; vinyl acetate-based copolymer such as styrene-sodium styrenesulfonate copolymer, styrene-2-hydroxy ethyl acrylate copolymer, styrene-2-hydroxy ethyl acrylate-potassium styrenesulfonate copolymer, styrene-maleic acid copolymer, styrene-maleic acid anhydride copolymer, vinyl naphthalene-acrylic acid copolymer, vinyl naphthalene-maleic acid copolymer, vinyl acetate-maleic acid ester copolymer, vinyl acetate-crotonic acid copolymer, vinyl acetate-acrylic acid copolymer; and salts thereof. Among these, examples of particularly preferable polymer include polyvinyl alcohol, polyvinylpyrrolidones and copolymers containing the same.

The weight-average molecular weight of the water-soluble polymer is preferably from 1,000 to 200,000. Further, the weight-average molecular weight as more preferably from 3,000 to 40,000.

Herein, the weight-average molecular weight adopts a value determined by using a gel permeation chromatography (GPC).

Examples of polyvinyl alcohol preferably used in the present invention include normal polyvinyl alcohol obtained by hydrolysis of polyvinyl acetate as well as modified polyvinyl alcohols such as polyvinyl alcohols the end of which is cationically modified, or anionically modified polyvinyl alcohol having an anionic group.

With respect to polyvinyl alcohol obtained by hydrolysis of vinyl acetate, those having an average degree of polymerization of 1,000 or higher are preferably used, and in particular, those having an average degree of polymerization of 1,500 to 5,000 are preferably used. The saponification degree is preferably 70 to 100%, and particularly preferably 80 to 99.5%.

The cationically modified polyvinyl alcohol is a polyvinyl alcohol comprising a primary to tertiary amino group or a quaternary ammonium group in the principal chain or side chain of the above-mentioned polyvinyl alcohol as described in, for example, Japanese Patent Application Laid-Open No. SHO 61-10483, and as obtained by saponifying a copolymer of an ethylenically unsaturated monomer having a cationic group and vinyl acetate.

Examples of an ethylenically unsaturated monomer having a cationic group include trimethyl-(2-acrylamide-2,2-dimethylethyl)ammonium chloride, trimethyl-(3-acrylamide-3,3-dimethylpropyl)ammonium chloride, N-vinylimidazole, N-vinyl-2-methylimidazole, N-(3-dimethylaminopropyl)methacrylamide, hydroxyl ethyl trimethyl ammonium chloride, trimethyl-(2-methacrylamide propyl)ammonium chloride and N-(1,1-dimethyl-3-dimethylaminopropyl)acrylamide. The ratio of a cationically modified group containing monomer of the cationically modified polyvinyl alcohol is 0.1 to 10 mole %, and preferably 0.2 to 5 mole % with respect to vinyl acetate.

Examples of the anionically modified polyvinyl alcohol include polyvinyl alcohol having an anionic group as described in Japanese Patent Application Laid-Open No. HEI 1-206088, a copolymer of vinyl alcohol and vinyl compound having a water-soluble group as described in Japanese Patent Application Laid-Open No. SHO 61-237681 and Japanese Patent Application Laid-Open No. SHO 62-307979, and a modified polyvinyl alcohol having a water-soluble group as described in Japanese Patent Application Laid-Open No. HEI 7-285265.

Examples of the nonionic modified polyvinyl alcohol include polyvinyl alcohol derivatives in which polyalkylene oxide group is added to a part of vinyl alcohol as described in Japanese Patent Application Laid-Open No. 7-9758; and a block copolymer of vinyl compound having a hydrophobic group and vinyl alcohol as described in Japanese Patent Application Laid-Open No. HEI 8-25795. Two or more of the polyvinyl alcohols having different degrees of polymerization or different types of modification can be used in combination (Gelatin)

As a gelatin (water-swellable polymer) which is applicable to the present invention, a lime-treated gelatin as well as an acid-treated gelatin may be used. Further, a hydrolysate of a gelatin, or an enzymatic decomposition product of a gelatin can also be used. These water-swellable polymers may be used alone, or a plurality of types of water-swellable polymers can be used.

(Polysaccharide Thickener)

Examples of a polysaccharide thickener which can be used in the present invention include generally known natural simple polysaccharides, natural complex polysaccharides, synthetic simple polysaccharides and synthetic complex polysaccharides. For the details of these polysaccharides, see "Encyclopedia of Biochemistry (Seikagaku Jiten) second edition, published by Tokyo Kagaku Dojin", "Food Industry" volume 31 (1988) page 21, or the like.

The polysaccharide thickener in the present invention is a saccharide copolymer which has a large number of hydrogen bonding groups in the molecule, and is one of polysaccharides which has a property of having a large difference between the viscosity at a low temperature and the viscosity at a high temperature due to the hydrogen bonding strength difference between the molecules depending on temperature. Further, the polysaccharide thickener as polysaccharides having a viscosity rise property in which, when metal oxide fine particle is added to the polysaccharides, increase in the viscosity which is assumed to be due to the hydrogen bonding to the metal oxide fine particle is caused, and the viscosity rise due to the addition of the metal oxide fine particle at 40° C. is 1.0 mPa·s or higher, preferably 5.0 mPa·s or higher and more preferably 10.0 mPa·s or higher.

Examples of the polysaccharide thickener which is applicable to the present invention include β1-4glucan (for example, carboxy methyl cellulose, carboxy ethyl cellulose), galactan (for example, agarose, agaropectin), galactomannoglycan (for example, locust bean gum, guaran), xyloglucan (for example, tamarind gum, tamarind seed gum), glucomannoglycan (for example, konjak mannan, wood-derived glucomannan, xanthane gum), galactoglucomannoglycan (for example, coniferous wood-derived glycan), arabinogalactoglycan (for example, soybean-derived glycan, microorganism-derived glycan), glucorhamnoglycan (for example, gellan gum), glycosaminoglycan (for example, hyaluronic acid, keratan sulfate) and red algae-derived natural polymer polysaccharides such as alginic acid and alginate, agar, κ-carrageenan, λ-carrageenan, t-carrageenan and furcellaran. From the viewpoint of not decreasing the dispersion stability of a metal oxide fine particle coexisting in a coating liquid, those not having, as a constitution unit, a carboxylic acid group or a sulfonic acid group are preferred. Preferred examples of such polysaccharides include pentose such as L-arabinose, D-ribose, 2-deoxyribose or D-xylose; polysaccharides composed of only hexose such as D-glucose, D-fructose, D-mannose, D-galactose. Specifically, tamarind seed gum known to be xyloglucan whose principal chair) is glucose and whose side chain is xylose; guar gum, locust bean gum, tara gum known to be galactomannan whose principal chain is mannose and whose side chain is galactose; and arabinogalactan whose principal chain is galactose and whose side chain is arabinose are preferably used.

In the present invention, two or more polysaccharide thickeners may further be used in combination.

The content of the polysaccharide thickener in each of the refraction layers (low refractive layer 12, high refractive layer 11) and the mixed region (mixed layer 13) is preferably from 5 mass % to 50 mass %, and more preferably, from 10 mass % to 40 mass %. When the polysaccharide thickener is used in combination with other water-soluble polymers, emulsion resins or the like, the content of the polysaccharide thickener may be 3 mass % or more. When the polysaccharide thickener is small, the transparency has a stronger tendency to degrade due to disturbance on the surface of the film when the coating is dried. On the other hand, when the content is 50 mass % or less, the relative content of the metal oxide is suitable, which makes easy to enlarge the refractive index difference between the high refractive layer suit the low refractive layer.

(Inorganic Polymer)

Examples of an inorganic polymer which can be used in the present invention include a zirconium atom-containing compound or an aluminum atom-containing compound.

A zirconium atom-containing compound applicable to the present invention does not include zirconium oxide, and specific examples thereof include zirconium difluoride, zirconium trifluoride, zirconium tetrafluoride, hexafluorozirconate (for example, potassium salt), heptafluorozirconate (for example, sodium salt, potassium salt or ammonium salt), octafluorozirconate (for example, lithium salt), zirconium fluoride oxide, zirconium dichloride, zirconium trichloride, zirconium tetrachloride, hexachlorozirconate (for example, sodium salt or potassium salt), zirconium oxychloride (zirconyl chloride), zirconium dibromide, zirconium tribromide, zirconium tetrabromide, zirconium bromide oxide, zirconiuim triiodide, zirconium tetraiodide, zirconium peroxide, zirconium hydroxide, zirconium sulfide, zirconium sulfate, zirconium p-toluenesulfonate, zirconyl sulfate, sodium zirconyl sulfate, acidic zirconyl sulfate trihydrate, potassium zirconium sulfate, zirconium selenate, zirconium nitrate, nitrate zirconyl, zirconium phosphate, zirconyl carbonate, ammonium zirconyl carbonate, zirconium acetate, zirconyl acetate, zirconyl ammonium acetate, zirconyl lactate, zirconyl citrate, zirconyl stearate, zirconyl phosphate, zirconium oxalate, zirconium isopropylate, zirconium butyrate, zirconium acetylacetonate, acetylacetone zirconium butyrate, zirconium stearate butyrate, zirconium acetate, bis(acetylacetonate)dichloro zirconium and tris (acetylacetonate)chloro zirconium.

Among these compounds, zirconyl carbonate, ammonium zirconyl carbonate, zirconyl acetate, nitrate zirconyl, zirconyl oxychloride, zirconyl lactate and zirconyl citrate are preferred, and particularly ammonium zirconyl carbonate, zirconyl oxychloride, zirconyl acetate are preferred. Specific examples of the trade name of the above-mentioned compounds include Zirconyl Acetate ZA (trade name) manufactured by Daiichi Kigenso Kagaku Kogyo Co., Ltd. and Zirconyl Oxychloride (trade name) manufactured by Daiichi Kigenso Kagaku Kogyo Co., Ltd.

Compounds containing a zirconium atom may be used alone, or two types of different compounds may be used in combination.

An compound containing aluminum atom in the molecular which can be used in the present invention does not include aluminium oxide, and specific examples thereof include aluminum fluoride, aluminum hexafluoride (for example, potassium salt), aluminium chloride, basic aluminium chloride (for example, aluminum polychloride), tetrachloro aluminate (for example, sodium salt), aluminum bromide, tetrabromo aluminate (for example, potassium salt), aluminum iodide, aluminate (for example, sodium salt, potassium salt, calcium salt), chloric acid aluminum, perchloric acid aluminum, thiocyanic acid aluminum, aluminium, sulfate, basic aluminium sulfate, potassium aluminum sulfate (alum), aluminum ammonium sulfate (ammonium alum), sodium aluminum sulfate, aluminum phosphate, aluminum nitrate, hydrogen aluminum phosphate, carbonic acid aluminum, polysulfuric acid, aluminum silicate, formic acid aluminum, aluminum acetate, aluminum lactate, aluminum oxalate, aluminum isopropylate, aluminum butyrate, ethylacetatealuminum diisopropylate, aluminum tris(acetylacetanato), aluminum tris(ethyl acetoacetate) and aluminum mono-acetylacetonato bis(ethyl acetoacetonato).

Among these, aluminum chloride, basic aluminum chloride, aluminium sulfate, basic aluminium sulfate and basic, aluminum silicate sulfate are preferred, and basic aluminum chloride and basic aluminium sulfate are most preferred.

(Curing Agent)

In the present invention, it is preferable to use a curing agent, to cure a water-soluble polymer which is a binder.

As a curing agent, which is applicable to the present invention is not particularly restricted as long as the agent causes curing reaction with a water-soluble polymer, and is generally a compound comprising a group which can react with water-soluble polymer or a compound which accelerates the reaction between different groups which the water-soluble polymer comprises, which is appropriately selected depending on the types of the water-soluble polymer and used.

For example, in cases where the water-soluble polymer is polyvinyl alcohol, boric acids and salts thereof are preferred. The boric acids or salts thereof mean oxyacids and salts thereof whose central atom is a boron atom. Specific examples thereof include orthoboric acid, diboric acid, metaboric acid, tetraboric acid, pentaboric acid and octaboric acid and salts thereof.

Boric acids and salts thereof containing a boron atom as a curing agent may be used as a sole aqueous solution, or two or more types thereof may be mixed and used. Particularly preferred is a mixed aqueous solution of boric acid and borax.

Although an aqueous solution of boric acid and borax can be added in a relatively dilute aqueous solution, a concentrated aqueous solution can be obtained by mixing both the aqueous solutions, thereby concentrating the coating liquid. This also has an advantage of relatively freely controlling the pH of the aqueous solution added.

Other known curing agents may also be used, and specific examples thereof include epoxy-based caring agent (for example, diglycidyl ethyl ether, ethylene glycol diglycidyl ether, 1,4-butanediol diglycidyl ether, 1,6-diglycidyl cyclohexane, N,N-diglycidyl-4-glycidyloxyaniline, sorbitol polyglycidyl ether, glycerol polyglycidyl ether), aldehyde-based curing agent (for example, formaldehyde, glyoxal), active halogen based curing agent (for example, 2,4-dichloro-4-hydroxy-1,3,5-s-triazine), active vinyl-based compound (for example, 1,3,5-tris-acryloyl-hexahydro-s-triazine, bisvinylsulfonyl methyl ether) and aluminum alum.

In cases where the water-soluble polymer is a gelatin, examples of curing agents include organic hardening agents such as vinylsulfone compound, urea-formaldehyde condensate, melanin formaldehyde condensate, epoxy-based compound, aziridine-based compound, active olefins, isocyanate-based compound and inorganic polyvalent metal salts such as chromium, aluminum and zirconium.

In cases where the water-soluble polymer is a polysaccharide thickener, examples of curing agents include epoxy-based compounds and aldehyde-based compounds.

The total amount of the above-mentioned curing agent used is preferably 1 to 600 mg per 1 g of the above-mentioned water-soluble polymer, and more preferably 100 to 600 mg per 1 g of the above-mentioned water-soluble polymer.

[Amino Acid]

To each of the refraction layers (low refractive layer 12, high refractive layer 11) and the mixed region (mixed layer 13; according to the present invention, an amino acid may be added in order to improve the dispersiveness of the metal oxide particles.

The amino acid in the present invention is a compound comprising an amino group and a carboxyl group in the same molecular and may be an amino acid of any types of α-, β-, γ- or the like, and is preferably an amino acid having an isoelectric point of 6.5 or less. Although some amino acids have optical isomers, there is no difference in the effect of the amino acid due to the existence of optical isomers, and any isomer having an isoelectric point of 6.5 or less can be used alone or in a racemic body.

For a detail explanation of amino acids applicable to the present invention, see the description in "the Encyclopedia of Chemistry, vol. 1" (Kagaku Daijiten 1), an abridged edition, 1960, published by Kyoritsu Shuppan Co., Ltd", pages 268-270.

In the present invention, examples of preferred amino acids include glycine, alanine, valine, α-aminobutyric acid, γ-aminobutyric acid, β-alanine, serine, ε-amino-n-caproic acid, leucine, norleucine, phenylalanine, threonine, asparagine, asparagic acid, histidine, lysine, glutamine, cysteine, methionine, proline and hydroxyproline. In order to use the amino acids as an aqueous solution, the solubility thereof at the isoelectric point is preferably 3 g or higher with respect to 100 g of water. For example, glycine, alanine, serine, histidine, lysine, glutamine, cysteine, methionine, proline, hydroxyproline or the like is preferably used, and from the viewpoint that the metal oxide particle has soft hydrogen banding with a binder, serine and hydroxy proline having a hydroxy group are more preferably used.

[Refraction Layer and Other Additives]

In the high refractive layer and the low refractive layer, and the mixed region (mixed layer) according to the present invention, a variety of additives can be contained as needed.

For example, a variety of known additives such as: an ultraviolet absorber as described in Japanese Patent Application Laid-Open No. SHO 57-74193, Japanese Patent Application Laid-Open No. SHO 57-87988, Japanese Patent Application Laid-Open No. SHO 62-261476 and the like; an anti-fading agent, a variety of anionic, cationic or nonionic surfactants as described in Japanese Patent Application Laid-Open No. SHO 57-74192, Japanese Patent Application Laid-Open No. SHO 57-87989, Japanese Patent Application Laid-Open No. SHO 60-72785, Japanese Patent Application Laid-Open No. SHO 61-156591, Japanese Patent Application Laid-Open No. HEI 1-95091, Japanese Patent Application Laid-Open No. HEI 3-13376 and the like; and fluorescent whitening agent, sulfuric acid, phosphoric acid, acetic acid, citric acid, sodium hydroxide, potassium hydroxide, a pH adjuster such as potassium carbonate, antifoaming agent, a lubricant such as diethylene glycol, antiseptic, antistatic agent, matting agent and the like as described in Japanese Patent Application Laid-Open No. SHO 59-42993, Japanese Patent Application Laid-Open No. SHO 59-52689, Japanese Patent Application Laid-Open No. SHO 62-280063, Japanese Patent Application Laid-Open No. SHO 61-242871, Japanese Patent Application Laid-Open No. HEI 4-219266 and the like can also be contained.

[Method of Producing Film]

The near-infrared reflective film of the present invention can be produced individually or simultaneously by coating and drying each component layer comprising the high refractive layer 11, the low refractive layer 12 send the mixed layer 13 by an appropriately selected known coating method. As the coating method, for example, a roll coating method, a rod bar coating method, an air knife coating method, a spray coating method, a curtain coating method, or a slide bead coating method, an extrusion coating method or the like which uses a hopper as described in U.S. Pat. No. 2,761,419 and U.S. Pat. No. 2,761,791 is preferably used.

As mentioned above, in the mixed region (mixed layer), the ratio of different metal oxide fine particles (the first metal oxide particle and the second metal oxide particle) preferably varies in a plurality of step, and more preferably varies continuously.

Accordingly, the formation of a mixed region (mixed layer) can be attained by a method in which coating liquids are produced such that the mixing ratios of the two layers of a high refractive layer and a low refractive layer are varied to be gradually changed, and multi-layer coating of the thus obtained coating liquids is performed by using the above-mentioned coating method.

(Multiple Layer Coating)

However, more preferably, after water-based simultaneous multiple layer coating of a plurality of component layers containing a high refractive layer and a low refractive layer on a support using an appropriately selected known coating method, setting and drying are performed to produce a mixed layer. Namely, in accordance with another embodiment of the present invention, there is provided a method of producing a near-infrared reflective film, comprising forming two layers of different refractive indices, and a mixed layer in which the ratio of different metal oxide particles continuously varies located between the two layers having different refractive indices, by simultaneous multiple layer coating of a first coating liquid containing a first water-soluble polymer and a first metal oxide particle and a second coating liquid containing a second water-soluble polymer and a second metal oxide particle.

By simultaneous multiple layer coating of a high refractive layer and a low refractive layer, a mixed region (mixed layer) or the high refractive layer and the low refractive layer can be provided between the high refractive layer and the low refractive layer, where the refractive indices can be made vary continuously from a high refractive region to a low refractive region in the mixed region (mixed layer).

In the embodiment, since the laminated body is formed by multiple layer coating, the mass ratio (F/B) of the water-soluble polymer and the metal oxide particle in the coating liquid of each layer is preferably in a range of 0.3 to 20, more preferably in a range of 0.3 to 10, still more preferably in a range of 0.5 to 10, particularly preferably in a range of 1.0 to 10, and most preferably in a range of 0.5 to 5.

In the coating liquid of each layer, the coating liquid concentration of the water-soluble polymer is preferably 0.3 to 3 mass %, and more preferably 0.35 to 2 mass %.

It is assumed that, by simultaneous multiple layer, mixing at each interface of the layers occurs to some degree until respective ceasing liquid is set, to thereby form the mixed region. Even if the mixed lever (mixed region) is formed by other mechanisms other than the above, the technical scope of the present invention is not affected thereby at all.

"Setting" herein means a process in which, for example by means of decreasing the temperature of a film by blowing a cool air or the like on the film, the viscosity of a film composition is increased to lower the fluidity of materials between the layers and in each layer. Specifically, the time from coating to setting (setting time) refers to a time from blowing a cool air to the surface of a coated film until nothing sticks to a finger when the finger presses the surface.

In the case of using cool air, the temperature condition (cool air temperature during setting) is preferably 25° C. or lower, more preferably 15° C. or lower and still more preferably 10° C. or lower. The condition is preferably 1° C. or higher and more preferably 5° C. or higher.

The time for the coated film to be exposed to cool air depends on the coating conveying speed, and is preferably 10 seconds to 120 seconds.

The time from simultaneous multiple layer coating of a high refractive layer and a low refractive layer to setting by way of their sol-gel transition, in other words, the time from simultaneous multiple layer coating of the first coating liquid and the second coating liquid is preferably 5 minutes or less, and preferably 2 minutes or less. It is preferred to take 45 seconds or more. This is for the laminated film to have a refractive index profile corresponding to the case in which the ratio of the optical film thicknesses is A: 1/3, B: 1/6, C: 1/3, namely to have a refractive index profile such that the position where the refractive index has a value of 2/3 with respect to the maximum refractive index is in a range of 0.9/3 to 1.1/3 with respect to the width (layer thickness) from the maximum refractive index to the minimum refractive index, from the maximum refractive index point; and such that the position where the refractive index has a value of 1.3 times the minimum refractive index is in a range of 0.9/3 to 1.1/3 with respect to the width (layer thickness) from the maximum refractive index to the minimum refractive index, from the minimum refractive index point. When the time to setting is too short, preferable mixing of components is not attained. When the setting time is too long, layer mixture proceeds too much, whereby a needed difference between the refractive indices is not obtained.

The setting time can be adjusted by adjusting the viscosity or the like by the component concentrations of vaster-soluble polymer, polysaccharide thickener, curing agent and/or the like, and/or the concentration of metal oxide particles. By this, the thickness of the mixed layer (mixed region) can be adjusted to be within the above-mentioned range.

When simultaneous multiple layer coating is performed, the viscosity of each coating liquid during coating is, in the case of using a slide bead coating method, preferably in a range of 5 to 100 mPa·s, and more preferably in a range of 10 to 50 mPa·s. When a curtain coating method is used, the viscosity is preferably in a range of 5 to 1200 mPa·s, and more preferably in a range of 25 to 500 mPa·s.

The viscosity of the coating liquid at 15° C. is preferably 100 mPa·s or higher, more preferably 100 to 30,000 mPa·s, still more preferably 3,000 to 30,000 mPa·s, and most preferably 10,000 to 30,000 mPa·s.

As a coating and drying method, preferred is a method in which a coating liquid is heated to 30° C. or higher, and coating is performed, and then the temperature of a film formed is cooled to a temperature of 1 to 15° C. temporarily to be dried at 10° C. or higher, and more preferred is a method in which the drying is performed under a drying condition at a wet bulb temperature in a range of 5 to 50° C., and at a film surface temperature in a range of 10 to 50° C. As a cooling method just after coating, from the viewpoint of uniformity of a film formed, a horizontal setting method is preferably used.

In the case of storing a near-infrared reflective film, the near-infrared reflective film according to the present invention is preferably, after overcoating and drying, stored in a roll or stored after being cut into a sheet shape. Storing for a prescribed time, for example, from 1 day to 1 month serves to alleviate coating unevenness. The storing condition is preferably at 30 to 50° C. for 1 to 30 days.

[Application of Near-Infrared Reflective Film]

The near-infrared reflective film of the present invention can be applied to a wide variety of fields. For example, the film is bonded with an equipment (substrate) which is exposed in sunlight for a long time such as an exterior window of a building or an automotive window, and is used as a film for sticking to a window, a film for a plastic greenhouse for agriculture, mainly for the purpose of increasing the weather resistance. In particular, the near-infrared reflective film according to the present invention may be bonded to a substrate such as a glass or a glass substitute resin to be suitably used. By using a near-infrared reflective film according to the present invention, interference unevenness (iridescent unevenness) does not occur even when it is processed into a curved surface.

An adhesive (adhesive layer) is placed such that a near-infrared reflective film is on the side of the plane of incidence of sunlight (heat ray) when the film is bonded to a window glass or the like. When the near-infrared reflective film is sandwiched between the window glass and the base material, the film can be sealed against an ambient gas such as moisture, which is favorable for the durability. The near-infrared reflective film of the present invention is also placed exteriorly or outside of an automobile (for sticking on the exterior), and has environmental durability, which is preferable.

As the adhesive (adhesive layer) which is applicable to the present invention, an adhesive comprising a light-curing or heat-curing resin as a main ingredient can be used.

The adhesive is preferably the one which has durability against ultraviolet rays. An acrylic-based adhesive or a silicone-based adhesive is preferred. Further, from the viewpoint of adhesive property or cost, an acrylic-based adhesive is preferred, in particular, due to the ease of control of the anti-peeling-off property, solvent-based acrylic adhesive is preferred among solvent-based and emulsion-based acrylic adhesives. When a solution-polymerized polymer is used as a solvent-based acrylic adhesive, as the monomer thereof, a known monomer can be used.

A polyvinyl butyral resin used as an interlayer of a laminated glass, or an ethylene-vinyl thereof include plastic polyvinyl butyral [manufactured by SEKISUI CHEMICAL CO., LTD., Mitsubishi Monsanto Co., ltd. or the like], ethylene-vinyl acetate copolymer [manufactured by E. I. du Pont de Nemours and Company or manufactured by Takeda Pharmaceutical Company Limited; Dumiran], modified ethylene-vinyl acetate copolymer [manufactured by Tosoh Corporation; Melthene-G]. To the adhesive layer, ultraviolet absorber, antioxidant, antistatic agent, heat stabilizer, lubricant, filler, colorant, adhesion adjusting agent and/or the like may be appropriately added and compounded.

EXAMPLE

The present invention will now be specifically described by way of Examples, but not limited thereto. In Examples, terms "%" and "parts" are used, and unless otherwise specified, they refer to "mass %" and "parts by mass", respectively.

Sample 1-1 to 1-16

Production of Sample 1-1

Preparation of High Refractive Layer Coating Liquid 1-1

To 10.3 parts of pure water, 130 parts of 1.0 mass % tamarind seed gum, 10.3 parts of 5.0 mass % solution of polyvinyl alcohol (PVA217, manufactured by KURARAY CO., LTD., weight-average molecular weight: 80,000), 17.3 parts of 14.8 mass % aqueous nicotinic acid solution and 2.58 parts of 5.5 mass % aqueous boric acid solution were added and mixed, then 38.2 parts of the below-mentioned titanium dioxide dispersion 1 was added and mixed to finally finish with pure water into 223 parts to thereby prepare a high refractive layer coating liquid 1-1.

<Preparation of Titanium Dioxide Dispersion 1>

28.9 parts of 20.0 mass % titanium dioxide sol containing a rutile-type titanium dioxide fine particle having a volume average particle size of 35 nm, 3.41 parts of 14.8 mass % aqueous picolinic acid solution and 3.92 parts of 2.1 mass % aqueous lithium hydroxide solution were mixed and dispersed to prepare a titanium dioxide dispersion 1.

(Preparation of Low Refractive Layer Coating Liquid 1-1)

9.18 parts of 23.5 mass % aqueous aluminum polychloride (manufactured by Taki Chemical Co., Ltd., Takibine #1500) solution, 510 parts of 10 mass % aqueous colloidal silica (manufactured by Nissan Chemical Industries, Ltd., SNOWTEX OS, average particle size: 10 nm) solution, 103.4 parts of 5.5 mass % aqueous boric acid solution and 4.75 parts of 2.1 mass % aqueous lithium hydroxide solution were mixed and dispersed to finish with pure water into 1000 parts to thereby prepare a silicon dioxide dispersion 1.

Next, to 17.6 parts pure water, 26.2 parts of 1.0 mass % aqueous tamarind seed gum solution, 3.43 parts of 3.0 mass % aqueous polyvinyl alcohol (PVA217, manufactured by KURARAY CO., LTD., weight average molecular weight: 80,000) solution and 0.06 parts of 2.1 mass % aqueous picolinic acid solution were added and mixed, then 96.5 parts or the above-mentioned silicon dioxide dispersion 1 was added and mixed to finally finish with pure water into 150 parts to thereby prepare a low refractive layer coating liquid 1-1.

(Preparation of Mixed Region Coating Liquid 1-1)

The above-mentioned high refractive layer coating liquid 1-1 and low refractive layer coating liquid 1-1 were mixed in a ratio of 1:1 to prepare a mixed region coating liquid 1-1.

(Formation of Low Refractive Layer 1-1)

The low refractive layer coating liquid 1-1 prepared in the above was, while keeping warm at 45° C., coated on a polyethylene terephthalate film having a thickness of 50 μm which was heated to 45° C. in the condition of a dry film thickness of 175 nm by using a wire bar. Next, cool air was blown onto the film for 1 minute to set in the condition that the surface of the film was 15° C. or lower, followed by blowing warm air at 80° C. to dry to thereby form a low refractive layer 1-1.

(Formation of Mixed Layer (Mixed Region))

Next, the mixed region coating liquid 1-1 was, while keeping warm at 45° C., coated on the low refractive layer 1-1 of the above-mentioned polyethylene terephthalate film which was heated to 45° C. in the condition of a dry film thickness of 5.4 nm by using a wire bar. Next, cool air was blown onto the film for 1 minute to set in the condition that the surface of the film was 15° C. or lower, followed by blowing warm air at 80° C. to dry to thereby form a mixed layer (mixed region) 1.

(Formation, of High Refractive Layer 1-1)

Further, the high refractive layer coating liquid 1-1 was, while keeping warm at 45° C., coated on the mixed region 1 of the above-mentioned polyethylene terephthalate film which was heated to 45° C. in the condition of a dry film thickness of 135 nm by using a wire bar. Next, cool air was blown onto the film for 1 minute to set in the condition that the surface of the film was 15° C. or lower, followed by blowing warm air at 80° C. to dry to thereby form a high refractive layer 1-1.

(Formation of Laminated Body)

On low refractive layer 1-1/mixed layer 1/high refractive layer 1-1, 5 units, each similarly composed of low refractive layer 1-1/mixed layer 1/high refractive layer 1-1, were laminated to form an alternate laminated film composed of 6 units (18 layers) in total, then a low refractive layer 1-1 was further laminated on the uppermost layer to produce a sample 1-1 which is a near-infrared reflective film.

Production of Sample 1-2

A sample 1-2 which is a near-infrared reflective film was produced in the same manner as in the sample 1-1 except that the mixed region was formed in the condition that the dry film thickness of the mixed layer (mixed region) was 6.75 nm.

Production of Sample 1-3

A sample 1-3 of a near-infrared reflective film was produced in the same manner as in the sample 1-1 except that coating liquids obtained by mixing the low refractive layer coating liquid 1-1 and the high refractive layer coating liquid 1-1 at mixing ratios of 2:1 and 1:2 are coated and dried in the order mentioned into two layers such that each dry film thickness is 6.75 nm to form the mixed layer (mixed region).

Production of Sample 1-4

A sample 1-4 of a near-infrared reflective film was produced in the same manner as in the sample 1-1 except that coating liquids obtained by mixing the low refractive layer coating liquid 1-1 and the high refractive layer coating liquid 1-1 at mixing ratios of 4:1, 3:1, 2:1, 1:2, 1:3 and 1:4 are coated and dried in the order mentioned into six layers such that each dry film thickness is 6.75 nm to form the mixed layer (mixed region).

Production of Sample 1-5

A sample 1-5 of a near-infrared reflective film was produced in the same manner as in the sample 1-1 except that coating liquids obtained by mixing the low refractive layer coating liquid 1-1 and the high refractive layer coating liquid 1-1 at mixing ratios of 5:1, 4:1, 3:1, 2:1, 1.5:1, 1:1.5, 1:2, 1:3, 1:4 and 1:5 are coated and dried in the order mentioned into ten layers such that each dry film thickness is 6.75 nm to form the mixed layer (mixed region).

Production of Sample 1-6

A sample 1-6 of a near-infrared reflective film was produced in the same manner as in the sample 1-1 except that coating liquids obtained by mixing the low refractive layer coating liquid 1-1 and the high refractive layer coating liquid 1-1 at mixing ratios of 5:1, 4:1, 3:1, 2:1, 1.5:1, 1:1, 1:1.5, 1:2, 1:3, 1:4 and 1:5 are coated and dried in one order mentioned into 11 layers such that each dry film thickness is 6.33 nm to form the mixed layer (mixed region).

Production of Sample 1-7

A sample 1-7 of a near-infrared reflective film was produced in the same manner as in ulna sample 1-1 except that coating liquids obtained by mixing the low refractive layer coating liquid 1-1 and the high refractive layer coating liquid 1-1 at mixing ratios of 3:1, 2:1, 1:2 and 1:3 are coated and dried in the order mentioned into four layers such that each dry film thickness is 6.78 nm to form the mixed layer (mixed region).

Production of Sample 1-8

A sample 1-8 of a near-infrared reflective film was produced in the same manner as in the sample 1-7 except that, in the high refractive layer 1-2, polyvinyl alcohol in the high refractive layer coating liquid (PVA217, manufactured by KURARAY CO., LTD., weight-average molecular weight: 80,000) in the high refractive layer coating liquid 1-1 is replaced with PAC (aluminum polychloride (manufactured by Taki Chemical Co., Ltd., Takibine 1500)).

Production of Sample 1-9

A sample 1-9 of a near-infrared reflective film which was composed of a high refractive layer 1-3 said a low refractive layer 1-2 was produced in the same manner as in the sample 1-7 except that all of tamarind seed gum and polyvinyl alcohol of the high refractive layer coating liquid 1-1 and tamarind seed gum and polyvinyl alcohol PVA217 and PAC (aluminum polychloride (manufactured by Taki Chemical Co., Ltd., Takibine #1500)) of the low refractive layer coating liquid 1-1 were replaced with acid-treated gelatin and a high refractive layer coating liquid 1-3 and a low refractive layer coating liquid 1-2 were used instead.

Production of Sample 1-10

A sample 1-10 of a near-infrared reflective film composed of a high refractive layer 1-4 and a low refractive layer 1-3 was produced in the same manner as in the sample 1-7 except that the high refractive layer coating liquid 1-1 was changed into a high refractive layer coating liquid 1-4 in which the tamarind seed gum in the high refractive layer coating liquid was replaced with polyvinyl alcohol (PVA203, manufactured by KURARAY CO., LTD.), and PAC (aluminum polychloride) and tamarind seed gum in the low refractive layer coating liquid was replaced with polyvinyl alcohol (PVA203, manufactured by KURARAY CO., LTD.) to be changed into a low refractive layer coating liquid 1-3.

Production or Sample 1-11

A sample 1-11 of a near-infrared reflective film was produced in the same manner as in the sample 1-7 except that a high refractive layer 1-5 was employed which was formed by using, in place of the titanium dioxide dispersion 1 in the high refractive layer coating liquid, a zirconium oxide dispersion prepared from zirconium oxide sol in the same manner.

Production of Sample 1-12

A sample 1-12 of a near-infrared reflective film was produced by simultaneous multiple layer of the low refractive layer 1-1 and the high refractive layer 1-1, in the layer-order mentioned, in 12 layers in total.

For the multiple layer coating, a slide hopper coating apparatus was used. While maintaining the above-mentioned low refractive layer coating liquid 1-1 and high refractive layer coating liquid 1-1 at 45° C. simultaneous multiple layer coating thereof was performed on a polyethylene terephthalate film having a thickness of 50 µm heated to 45° C., alternately forming six layers for each liquid.

Immediately after coating, cool air at 5° C. was blown to set the film. In this case, the time until nothing sticks to a finger when the finger presses the surface (setting time) was 5 minutes.

After the setting is completed, a warm air at 80° C. was blown to dry the film, and a near-infrared reflective film was produced comprising, on a polyethylene terephthalate film, a laminated body (total number of layers: 23 layers) obtained by laminating a low refractive layer 1-1 (dry film thickness: 175 nm), a mixed layer (dry film thickness: 27 nm) and a high refractive layer 1-1 (dry film thickness: 135 nm). The confirmation of a mixed region between the layers (mixed layer) and measurement of the film thickness were performed by cutting the laminated film and measuring the abundance of the high refractive index material ($TiO_2$) and the low refractive index material ($SiO_2$) on the cutting plane with an XPS surface analyzer.

Production of Sample 1-13

A film composed only of a low refractive layer and a high refractive layer was produced in the same manner as in the sample 1-1 except that coating of a mixed layer (mixed region) was not performed. A sample 1-13 of a near-infrared reflective film was produced.

Production of Sample 1-14

A sample 1-14 of a near-infrared reflective film was produced by sequentially producing a titanium dioxide ($TiO_2$) film (thickness: 105 nm) as a high refractive layer 1-6 and a silicon dioxide ($SiO_2$) film (thickness: 175 nm) as a low refractive layer 1-4 on a polyethylene terephthalate film having a thickness of 50 µm by a method of using a sputtering film forming apparatus as described in Example 1 of Japanese Patent Application Laid-Open No. 2007-148330, and further by sequentially laminating a titanium dioxide ($TiO_2$) film (thickness: 105 nm), a silicon dioxide ($SiO_2$) film (thickness: 175 nm) and a titanium dioxide ($TiO_2$) film (thickness: 105 nm).

Production of Sample 1-15

A sample 1-15 of a near-infrared reflective film was produced by a method as described in Japanese Patent Application Laid-Open No. 2004-123766.
(Formation of High Refractive Layer 1-7)
100 parts by mass of isopropyl alcohol (Wako Pure Chemical Industries, Ltd., special grade chemicals), 3 parts by mass of pyridine (Wako Pure Chemical Industries, Ltd., special grade chemicals), 5 parts by mass of ethyl silicate solution (manufactured by COLCOAT CO., LTD., HAS-1, active component 30 mass %) and 10 parts by mass of rutile-type titanium dioxide fine particle (manufactured by ISHIHARA SANGYO KAISHA, LTD., TTO-55) were added, and then dispersed for four hours with a ball mill to confirm that a dispersed particle size D50 of 20 nm be obtained, followed by adding 1.5 parts by mass of ultraviolet ray curable binder (manufactured by Shin-Etsu Chemical Co., Ltd., X-12-2400, active component 30 mass %) and 0.15 parts by mass of catalyst (manufactured by Shin-Etsu Chemical Co., Ltd., DX-2400) and dispersing for one hour with a ball mill to confirm that a dispersed particle size D50 of 16 nm be obtained, thereby obtaining a high refractive index coating liquid. The obtained liquid was coated on a polyethylene terephthalate film (also referred to as a PET film) having a thickness of 50 μm by using a bar coater No. 08 such that the film thickness after drying was 100 nm and dried at 100° C., followed by curing by irradiation of ultraviolet rays (illuminance 200 to 450 mW/cm$^2$) to form a high refractive layer 1-7. The reflective index of the high refractive layer 1-7 was 2.17.

(Formation of Low Refractive Layer 1-5)

1 part by mass of silica sol (manufactured by Nissan Chemical Industries, Ltd., "IPA-ST") having a particle size of 10 to 20 nm (average particle size 15 nm), 10 parts by mass of isopropyl alcohol (manufactured by Wako Pure Chemical Industries, Ltd., special grade chemicals) as a solvent, 5 parts by mass of an ultraviolet ray curable binder (manufactured by Shin-Etsu Chemical Co., Ltd., X-12-2400) as a binder, 0.6 parts of catalyst (manufactured by Shin-Etsu Chemical Co., Ltd., DX-2400) were added and stirred with a stirrer to obtain a low refractive layer coating liquid. The primary particle diameter of the silica sol (refractive index 1.45) was substantially uniform, and a slurry having a dispersed particle size D50 of 45 nm was obtained.

Next, on the high refractive layer 1-7 of a sample in which the high refractive layer 1-7 is formed on a polyethylene terephthalate film having a thickness of 50 μm, the above-mentioned prepared low refractive layer coating liquid was coated by using a bar coater No. 08 such that the film thickness after drying was 100 nm, and dried at 100° C., and then cured by irradiating ultraviolet rays (illuminance 200 to 450 mw/cm$^2$) to form a low refractive layer 1-5. The refractive index of the low refractive layer 1-5 formed was 1.35.

(Formation of Laminated Body)

Further, the high refractive layers 1-7 and the low refractive layers 1-5 were alternately laminated each in three layers to produce a sample 1-15 of a near-infrared reflective film in eight layers in total.

Production of Sample 1-16

A multi-layer polymer mirror film was produced by a method as described in Japanese Translation of PCT International Application Publication No. 2004-503402.

Specifically, a multi-layer polymer IR mirror film having a thickness of 2 mils (0.005 cm) was produced by a 224-layer alternate fine layer of a first polymer of coPEN manufactured by 3M (90% PEN/10% PET) (high refractive layer 1-8) and a second polymer of PMMA CP71 manufactured by Ineos Acrylics (low refractive layer 1-5). This film also contained a coPEN skin layer on the outside of the multi-layer stack and a PBL inner layer. Total thickness of the skin and the PBL was about 37% of the whole film structure. The film was firstly drawn in the MD direction at a draw ratio of about 3.3:1 by using a longitudinal drawing machine, and then drawn in the TD direction at a draw ratio of about 4.0:1 by using a tenter. The temperature of the tenter was 135° C. at a preheating zone, 138° C. at a drawing zone and 49° C. at a cooling zone. The residence time of the heat-setting zone was about 10 seconds. A sample 1-16 of a near-infrared reflective film was produced.

[Evaluation]

Evaluation was performed for the produced near-infrared reflective film samples 1-1 to 1-16.

(Measurement of Refractive Index of Each Layer)

An objective layer (high refractive layer, low refractive layer) whose refractive index was to be measured was coated in a single layer on a base material to produce a sample, end according to the method below, the refractive index of each of the high refractive layers and low refractive layers was determined.

The back surface of the measurement side of each sample underwent a roughening treatment, then a light-absorbing treatment with a black spray paint to prevent reflection of a light on the back surface, and then, by using U-4000 type spectrophotometer (manufactured by Hitachi, Ltd.), the reflectivity in the visible light region (400 nm to 700 nm) was measured in a five-degree regular reflection condition to determine the refractive index.

(Evaluation of Refractive Index Unevenness)

Each of the above-mentioned produced near-infrared reflective film samples 1-1 to 1-10 was cut into 10 cm×10 cm, and placed marks at 2 cm intervals vertically and horizontally to form 5×5, 25 blocks in total. By the frontal observation and 45 degrees oblique observation of the near-infrared reflective film, the presence or absence of interference unevenness (iridescent unevenness) caused by in-plane refractive index unevenness was observed to evaluate in-plane resistance to refractive index unevenness in accordance with the standard below.

5: No interference unevenness was observed on all of the 25 blocks.

4: Weak interference unevenness was observed on one block of the 25 blocks.

3: Interference unevenness was observed on two to five blocks of the 25 blocks.

2: Interference unevenness was observed on six to ten blocks of the 25 blocks.

1: Strong interference unevenness was observed on 11 or more blocks of the 25 blocks.

(Measurement of Near-Infrared Transmittance)

By using the above-mentioned spectrophotometer (an integrating sphere was used; manufactured by Hitachi, Ltd., U-4000 type), the transmittance was measured. As the near-infrared transmittance value, the transmittance value at 1200 nm was employed. The smaller the value, the more excellent the near-infrared reflecting power.

Evaluation results are listed below.

TABLE 1

| Near-infrared reflective film # | Refractive layer structure | | | | | | | Refractive index difference | Interference unevenness | Near-infrared transmittance | Remarks |
|---|---|---|---|---|---|---|---|---|---|---|---|
| | High refractive layer | | Low refractive layer | | Mixed region | | | | | | |
| | # | Refractive index | # | Refractive index | Thickness ratio | Step # | | | | | |
| 1-1 | 1 | 2.00 | 1 | 1.44 | 4 | 1 | | 0.56 | 2 | 18 | Present invention |
| 1-2 | 1 | 2.00 | 1 | 1.44 | 5 | 1 | | 0.56 | 3 | 15 | Present invention |
| 1-3 | 1 | 2.00 | 1 | 1.44 | 10 | 2 | | 0.56 | 4 | 10 | Present invention |

TABLE 1-continued

| Near-infrared reflective film # | Refractive layer structure | | | | | | Refractive index difference | Interference unevenness | Near-infrared transmittance | Remarks |
|---|---|---|---|---|---|---|---|---|---|---|
| | High refractive layer | | Low refractive layer | | Mixed region | | | | | |
| | # | Refractive index | # | Refractive index | Thickness ratio | Step # | | | | |
| 1-4 | 1 | 2.00 | 1 | 1.44 | 19 | 6 | 0.56 | 4 | 6 | Present invention |
| 1-5 | 1 | 2.00 | 1 | 1.44 | 27 | 10 | 0.56 | 3 | 14 | Present invention |
| 1-6 | 1 | 2.00 | 1 | 1.44 | 32 | 11 | 0.56 | 2 | 19 | Present invention |
| 1-7 | 1 | 2.00 | 1 | 1.44 | 20 | 4 | 0.56 | 4 | 10 | Present invention |
| 1-8 | 2 | 1.97 | 1 | 1.44 | 20 | 4 | 0.53 | 2 | 11 | Present invention |
| 1-9 | 3 | 2.04 | 2 | 1.42 | 20 | 4 | 0.62 | 4 | 7 | Present invention |
| 1-10 | 4 | 1.95 | 3 | 1.46 | 20 | 4 | 0.49 | 2 | 11 | Present invention |
| 1-11 | 5 | 1.87 | 1 | 1.46 | 20 | 4 | 0.49 | 3 | 10 | Present invention |
| 1-12 | 1 | 2.00 | 1 | 1.44 | 20 | Continuous | 0.56 | 5 | 5 | Present invention |
| 1-13 | 1 | 2.00 | 1 | 1.44 | — | — | 0.56 | 1 | 21 | Comparative example |
| 1-14 | 6 | 2.55 | 4 | 1.45 | — | — | 1.10 | 1 | 20 | Comparative example |
| 1-15 | 7 | 2.17 | 5 | 1.35 | — | — | 0.82 | 1 | 61 | Comparative example |
| 1-16 | 8 | 1.63 | 6 | 1.495 | — | — | 0.135 | 1 | 6 | Comparative example |

*1: Refractive index of high refractive layer − Refractive index of low refractive layer In Table 1, the thickness ratio means the ratio (%) of a region (mixed layer) where different metal oxide particles are mixed against the thickness where 75% or more of the maximum metal oxide content of a neighboring layer (a high refractive layer or a low refractive layer) that only contains one type of metal oxide particle existed. It is found that the films having the structure of the present invention are improved in the occurrence of interferences unevenness compared to the films of the comparative examples.

Samples 2-1 to 2-13

(Preparation of High Refractive Layer Coating Liquid 2-1)

To 15.2 g of 20.0 mass % titanium oxide sol (volume average particle size 35 nm, rutile-type titanium, dioxide particle), 225 g of 5.0 mass % acid-treated aqueous gelatin solution was slowly added and mixed with stirring. As a surfactant, 0.43 g of a 5.0 mass % 2-DB-5000: (manufactured by NOF CORPORATION) was then added to finish with 450 ml of pure water, thereby preparing a high refractive layer coating liquid 2-1.

(Preparation of High Refractive Layer Coating Liquids 2-2 to 2-10)

High refractive layer coating liquids 2-2 to 2-4 were prepared in the same manner as the high refractive layer coating liquid 2-1 except that the metal oxide particle/water-soluble polymer ratio (F/B) was the value in a Table.

High refractive layer coating liquids 2-5 to 2-7 were prepared in the same manner as the high refractive layer coating liquid 2-1 except that a titanium oxide sol and a gelatin (Gel) aqueous solution were mixed such that the value of F/B was as in a Table and there was no final finishing with pure water.

A high refractive layer coating liquid 2-8 was prepared in the same manner as the high refractive layer coating liquid 2-4 except that $TiO_2$ was replaced with $ZrO_2$.

A high refractive layer coating liquid 2-9 was prepared in the same manner as the high refractive layer coating liquid 2-4 except that the acid-treated aqueous gelatin solution in the high refractive layer coating liquid 2-4 was replaced with an equivalent amount of polyvinyl alcohol (1:1 mixture of PVA203 and PVA217).

A high refractive layer coating liquid 2-10 was prepared in the same manner as the high refractive lever coating liquid 2-4 except that the acid-treated aqueous gelatin, solution in the high refractive layer coating liquid 2-4 was replaced with an equivalent amount of an aqueous solution of polyvinyl alcohol and tamarind seed gum (mixed at a rate of PVA/TG=1/2.5).

(Preparation of Low Refractive Layer Coating Liquid 2-1)

To 14.2 g of 21.4 mass % colloidal silica (average particle) size: 10 nm), 330 g of a 5.0 mass % acid-treated aqueous gelatin solution and 127 g of 1.0 mass % hydroxy ethyl cellulose (HEC) were slowly added and mixed with stirring. As a surfactant, 0.64 g of 5.0 mass % 2-DB-500E (manufactured by NOF CORPORATION) was then added to finish with 650 ml of pure water, thereby preparing a low refractive layer coating liquid 2-1.

(Preparation of Low Refractive Layer Coating Liquids 2-2 to 2-9)

Low refractive layer coating liquids 2-2 to 2-5 were prepared in the same manner as the low refractive layer coating liquid 2-1 except that time metal oxide particle/water-soluble polymer ratio (F/B) was the value as in Table 1.

Low refractive layer coating liquids 2-6 to 2-7 were prepared in the same manner as the high refractive layer coating liquid 2-1 except that colloidal silica, aqueous gelatin solution, HEC aqueous solution were mixed such that the metal oxide particle/water-soluble polymer ratio (F/B) was the value as in the Table 1 and there was no final finishing with pure water.

A low refractive layer coating liquid 2-8 was prepared in the same manner as the low refractive layer coating liquid 2-4 except that the acid-treated aqueous gelatin solution in the low refractive layer coating liquid 2-4 was replaced with an equivalent amount of polyvinyl alcohol (1:1 mixture of PVA203 and PVA217).

A low refractive layer coating liquid 2-9 was prepared in the same manner as the low refractive layer coating liquid 2-4 except that the acid-treated aqueous gelatin solution in the low refractive layer coating liquid 2-4 was replaced with an equivalent amount of an aqueous solution of polyvinyl alcohol and tamarind seed gum (mixed at a rate of PVA/TG=1/2.5).

Production of Sample 2-1

A slide hopper coating apparatus capable of 16-layer multiple layer coating was used. While maintaining the above-mentioned low refractive layer coating liquid 2-1 and high refractive layer coating liquid 2-1 at 45° C., simultaneous multiple layer coating thereof was performed on a polyethylene terephthalate film (manufactured by TOYOBO CO., LTD., A4300: double-sided adhesive layer) having a thickness of 50 µm heated to 45° C., alternately forming eight layers for each liquid. The flow rate of the coating liquid of each layer was set such that, when assuming no mixed layer formed, the film thickness after drying was 175 nm for each low refractive layer and 130 nm for each high refractive layer.

Immediately after coating, cool air at 5° C. was blown to set the film. In this case, the time until nothing sticks to a finger when the finger touches the surface (setting time) was 5 minutes.

After the setting as completed, a warm air at 80° C. was blown to dry the film, and a sample 2-1 was produced.

Production of Samples 2-2 to 2-12

Samples 2-2 to 2-7 were produced in the same manner as the sample 2-1 except that, each high refractive layer coating liquid 2-1 was replaced with high refractive layer coating liquids 2-2 to 2-7, and each low refractive layer coating liquid 2-1 was replaced with low refractive layer coating liquids 2-2 to 2-1.

A sample 2-8 was produced in the same manner as the sample 2-1 except that the cool air temperature during setting was 1° C.

A sample 2-9 was produced in the same manner as the sample 2-1 except that the cool air temperature during setting was 15° C.

A sample 2-10 was produced in the same manner as the sample 2-4 except that the high refractive layer coating liquid 2-8 was changed into a high refractive layer treating liquid 2-8.

A sample 2-11 was produced in the same manner as the sample 2-4 except that the high refractive layer coating liquid 2-4 was changed into a high refractive layer coating liquid 2-9, the low refractive layer coating liquid 2-4 was changed into a low refractive layer coating liquid 2-8.

A sample 2-12 was produced in the same manner as the sample 2-4 except that the high refractive layer coating liquid 2-4 was changed into a high refractive layer coating liquid 2-16, and the low refractive layer coating liquid 2-4 was changed into a low refractive layer coating liquid 2-9.

Production of Sample 2-13

Only the low refractive index coating liquid 2-4 was coated on a polyethylene terephthalate film, set and dried; further, the high refractive layer coating liquid 2-4 was coated thereon, set and dried; and still further, the low refractive index coating liquid 2-4 was coated thereon. By repeating this procedure alternately, eight layers of the low refractive layers and eight layers of high refractive layers (16 layers in total) were laminated to produce a sample 2-13.

Production of Sample 2-14

A three-component system multi-layer optical interference film was produced as described in Japanese Patent No. 3067863, thereby to obtain an apparently transparent film which reflects infrared rays of the sunlight. The co-extruded film contained the following three polymer components: a component A which as a styrene-methyl methacrylate copolymer having a refractive index of 1.57 and a density of 1.08; a component B which is a methyl methacrylate-styrene copolymer having a refractive index of 1.53 and a density of 1.13; and a component C which is a polymethylmethacrylate having a refractive index of 1.49 and a density of 1.20. Polycarbonate skin layers for providing mechanical properties were provided on both surfaces of the film. This three-component film was co-extruded to obtain a 165-layer film having ABCB repeating units. A three-component feed block has 42 feed slots for component A, 82 feed slots for component B said 41 feed slots for component C. Three individual extruders provided each polymer component with the feed block at a rate of 8.5 kg/hr for component A, at a rate of 9.0 kg/hr for component B and at a rate of 9.8 kg/hr for component C. Further, as the skin layer, polycarbonate was co-extruded at a rate of 6.8 kg/hr on both the surfaces of the film. The drawdown of the film was adjusted such that a film having a film thickness of about 0.9 mils (1 mil=25.3895 µm) represented a strong primary reflectivity at 1400 nanometers to obtain a film having a layer thickness of 148.6 nanometers for component A, a layer thickness of 76.3 nanometers for component B and a layer thickness of 156.6 nanometers for component C. A near-infrared reflective film sample 2-14 in which the optical thickness ratio of the first component A, fA, was 1/3, the optical thickness ratio of the second component B, fB, was 1/6 and the optical thickness ratio of the third component C, fC was 1/3, and in which $nB=(nA \cdot nC)^{0.5}$ was obtained.

Production of Sample 2-15

On a polyethylene terephthalate film (manufactured by TOYOBO CO., LTD., A4300: double-aided adhesive layer) having a thickness 50 µm, a near-infrared reflective film was produced by a method described in Japanese Patent Application Laid-Open No. 2003-86659.

<Preparation of Dispersion A>

109 parts by mass of rutile-type titanium dioxide (manufactured by ISHIHARA SANGYO KAISBA, LTD., "TTO-55A", particle size: 30 to 50 nm, aluminium hydroxide surface treated product, refractive index: 2.6), 11 parts by mass of polyethyleneimine-based block polymer as a dispersant, and 180 parts by mass of polypropylene glycol monomethyl ether acetate (PGMEA, manufactured by Wako Pure Chemical Industries, Ltd.) were dispersed for 24 minutes by a bead mill dispenser using 141 parts by mass of zirconia bead having a diameter of 0.5 mm, and then, by changing the bead to a zirconia bead having a diameter of 0.1 mm, they were dispersed for 147 minutes by a bead mill disperser to obtain a dispersion A.

<Preparation of Solution A>

A PGMEA solution containing 50 mass % of 4,4-bis(β-methacrylyloxy ethylthio) diphenylsulfone (refractive index after curing: 1.65) as a binder resin and 0.25 mass % of 2,4,6-trimethylbenzoyl diphenylphosphine oxide as a polymerization initiator was prepared to obtain solution A.

<Preparation of Solution B>

A mixed solution of the dispersion A and the solution A at a mass mixing ratio of 1:7 was prepared to obtain a solution B.

<Preparation of Solution C>

A mixed solution of the solution B and PGMEA at a mass mixing ratio of 1:2 was prepared to obtain a solution C.

<Production of Heat Ray Shield Film A>

2 ml of the solution C was dropped on a polyethylene terephthalate film (manufactured by TOYOBO CO., LTD., A4300; double-sided adhesive layer) having a thickness of 50 μm, and coated by a spin coater (manufactured by MIKASA CO., LTD, 1H-D7) in a condition of 1000 rpm, 30 seconds, and then heated at 120° C. for 10 minutes. Then, by using an electrodeless mercury lamp (manufactured by Fusion UV Systems Japan KK) with an output of 184 W/cm, an ultraviolet ray with an accumulated radiation of 2.8 J/cm$^2$ was irradiated to obtain a high refractive layer A.

The high refractive layer A underwent a surface-modification by a corona discharge treatment (corona discharge surface-modifying separates manufactured by Shinko Electric & Instrumentation Co., Ltd.), and then 2 ml of 1 mass % hydroxy ethyl cellulose (manufactured by Tokyo Chemical Industry Co., Ltd.) aqueous solution was dropped and left to assure for 1 minute at room temperature, and then coated in a spin coating condition of 500 rpm, 30 seconds. Immediately after coating, the sample was placed on a hot plate (manufactured by AS ONE Corporation, HPD-3000) at 80° C. and heated for 10 minutes, whereby a low refractive layer was laminated on the high refractive layer A.

Further, on the low refractive layer, the high refractive layer A was formed by a similar operation to produce a near-infrared reflective film sample 2-15 composed of a three-layer laminated film of high refractive layer/low refractive layer/high refractive layer.

[Evaluation]

The produced near-infrared reflective film samples 2-1 to 2-15 were evaluated. The measurement of each layer for the refractive index and the near-infrared transmittance was performed by the same method as in the samples 1-1 to 1-16.

(Measure of Visible Light Transmittance)

By using the above-mentioned spectrophotometer (an integrating sphere was used, U-4000 type manufactured by Hitachi, Ltd.), the transmittance of each near-infrared reflective film in a region of 300 nm to 2000 nm were measured. For the visible light transmittance, the value of transmittance at 550 nm was employed.

(Durability Evaluation)

The state of a film on which an accelerated lightfastness testing was performed according to a weather testing method according to JIS A 5759: 2008 by using a sunshine carbon arc lamp weather tester defined in JIS B 7753; 2007 for 1000 hours was observed to evaluate the durability according to the standard below. The test was performed in a condition of water spray for 18 minutes during the conventional conditions of 120 minutes of irradiation.

Excellent: Interlayer film separation and film surface abnormality of the infrared reflective film were not observed.

Good: Interlayer film separation was not observed, but a slightly lifted portion was observed at an edge of the film surface.

Relatively poor: At an interlayer of the infrared reflective film, a slight film separation was observed, and the film surface was slightly crinkled.

TABLE 2

| | High refractive layer | | | Low refractive layer | | | | |
|---|---|---|---|---|---|---|---|---|
| Sample No. | Water-soluble polymer | Metal oxide particle | F/B | Water-soluble polymer | Metal oxide particle | F/B | Setting time (min) | Remarks |
| 2-1 | Gel | TiO$_2$ | 0.27 | Gel + HEC | SiO$_2$ | 0.27 | 5 | Present invention |
| 2-2 | Gel | TiO$_2$ | 0.3 | Gel + HEC | SiO$_2$ | 0.3 | 3 | Present invention |
| 2-3 | Gel | TiO$_2$ | 0.5 | Gel + HEC | SiO$_2$ | 0.5 | 2 | Present invention |
| 2-4 | Gel | TiO$_2$ | 1.0 | Gel + HEC | SiO$_2$ | 0.8 | 1.8 | Present invention |
| 2-5 | Gel | TiO$_2$ | 5.0 | Gel + HEC | SiO$_2$ | 5.0 | 1.5 | Present invention |
| 2-6 | Gel | TiO$_2$ | 10.0 | Gel + HEC | SiO$_2$ | 10.0 | 1 | Present invention |
| 2-7 | Gel | TiO$_2$ | 10.5 | Gel + HEC | SiO$_2$ | 10.5 | 1 | Present invention |
| 2-8 | Gel | TiO$_2$ | 1.0 | Gel + HEC | SiO$_2$ | 0.8 | 0.7 | Present invention |
| 2-9 | Gel | TiO$_2$ | 1.0 | Gel + HEC | SiO$_2$ | 0.8 | 6 | Present invention |
| 2-10 | Gel | ZrO$_2$ | 1.0 | Gel + HEC | SiO$_2$ | 0.8 | 1.8 | Present invention |
| 2-11 | PVA203 + PVA217 | TiO$_2$ | 1.0 | PVA203 + PVA217 | SiO$_2$ | 0.8 | 2.5 | Present invention |
| 2-12 | PVA217 + TG | TiO$_2$ | 1.0 | PVA217 + TG | SiO$_2$ | 0.8 | 2 | Present invention |
| 2-13 | Gel | TiO$_2$ | 1.0 | Gel + HEC | SiO$_2$ | 0.8 | 0.5 | Comparative example |
| 2-14 | — | — | — | — | — | — | — | Comparative example |
| 2-15 | None (UV curable resin) | TiO$_2$ | | HEC | — | | | Comparative example |

\* Setting time for sample 2-13 represents the time for each layer.

Unacceptable: Film separation was generated at an interlayer of the infrared reflective film, and a waviness was generated.

The above results are listed in Table 3.

TABLE 3

| Near-infrared reflective film | Refractive layer structure | | | | Refractive index difference *1 | Visible light transmittance | Infrared transmittance | Durability | Remarks |
|---|---|---|---|---|---|---|---|---|---|
| | High refractive layer | | Low refractive layer | | | | | | |
| | # | Refractive index | # | Refractive index | | | | | |
| 2-1 | 1 | 1.82 | 1 | 1.53 | 0.29 | 88 | 19 | ◉ | Present invention |
| 2-2 | 2 | 1.83 | 2 | 1.52 | 0.31 | 89 | 17 | ◉ | Present invention |
| 2-3 | 3 | 1.86 | 3 | 1.51 | 0.35 | 90 | 14 | ◉ | Present invention |
| 2-4 | 4 | 1.86 | 4 | 1.50 | 0.38 | 91 | 13 | ◉ | Present invention |
| 2-5 | 5 | 1.90 | 5 | 1.49 | 0.41 | 89 | 12 | ◉ | Present invention |
| 2-6 | 6 | 1.92 | 6 | 1.48 | 0.44 | 87 | 11 | ◉ | Present invention |
| 2-7 | 7 | 1.92 | 7 | 1.48 | 0.44 | 85 | 11 | ◉ | Present invention |
| 2-8 | 4 | 1.88 | 4 | 1.50 | 0.38 | 82 | 15 | ○ | Present invention |
| 2-9 | 4 | 1.88 | 4 | 1.50 | 0.38 | 87 | 17 | ○ | Present invention |
| 2-10 | 8 | 1.86 | 4 | 1.50 | 0.36 | 88 | 14 | ◉ | Present invention |
| 2-11 | 9 | 1.86 | 8 | 1.51 | 0.35 | 90 | 14 | ○ | Present invention |
| 2-12 | 10 | 1.87 | 9 | 1.50 | 0.37 | 89 | 14 | ◉ | Present invention |
| 2-13 | 4 | 1.88 | 4 | 1.50 | 0.38 | 79 | 15 | Δ | Comparative example |
| 2-14*² | 11 | 1.57 | 10 | 1.49 | 0.08 | 91 | 12 | X | Comparative example |
| 2-15*³ | 12 | 2.10 | 11 | 1.50 | 0.60 | 88 | 64 | Δ | Comparative example |

*1 Refractive index of high refractive layer − Refractive index of low refractive layer
*² 165 layers
*³ 3 layers As is seen from the results in Table 3, since the infrared reflective film samples formed by the simultaneous multiple layer coating of the present invention have a low infrared transmittance, and high order peak is hardly appeared in the visible light region, the film has a high visible light transmittance. The durability is also favorable because a good film adhesion is obtained due to aqueous multiple layer coating.

The confirmation of a mixed region between the layers (mixed layer) and measurement of the film thickness were performed by cutting the laminated film and measuring the abundance of the high refractive index material ($TiO_2$ or $ZrO_2$) and the low refractive index material ($SiO_2$) on the cutting plane with an XPS surface analyzer. As a result, although the slope of the abundance of the high refractive index material and the low refractive index material differs depending on the level, the presence of a mixed region in a nested state was confirmed in each of the methods of the present invention.

Production of Sample 2-16

An infrared reflective film having 93 layers in total composed of a first unit (total number of layers of low refractive layers, mixed layers and high refractive layers: 31 layers) obtained by laminating eight layers of low refractive layers and eight layers of high refractive layers each having the film thickness of 1.38 times that of the sample 2-4; a second unit (total number of layers of low refractive layers, mixed layers, high refractive layers: 31 layers) obtained by laminating on the first unit eight layers of low refractive layers and eight layers of high refractive layers each having the film thickness of 1.15 times that of the sample 2-4 and a third unit (total number of layers of low refractive layers, mixed layers, high refractive layers: 31 layers) obtained by laminating on the second unit eight layers of low refractive layers and eight layers of high refractive layers each having the same film thickness as that of a sample 2-4 was formed in the same manner as the above-mentioned sample 2-4.

The reflectivity of the infrared reflective film for each wavelength was measured to be found that an infrared reflective film was obtained which had reflection characteristic as in FIG. 3 where there was no high order reflection peak in the visible light region and there was a wide range of reflection region from near-infrared to infrared.

The present application is based on Japanese Patent Application No. 2010-240511 filed on Oct. 27, 2010 and Japanese Patent Application No. 2010-274489 filed on Dec. 9, 2010, the disclosures of which are incorporated herein in their entirety by reference.

DESCRIPTION OF THE REFERENCE NUMERALS 1 near-infrared reflective film
10 lamination unit
11 high refractive layer
12 low refractive layer 13 mixed layer
14 film support
20 partial region

The invention claimed is:

1. A near-infrared reflective film comprising a lamination unit comprising:
   a high refractive layer containing a first metal oxide particle and a first water-soluble polymer,
   a low refractive layer containing a second metal oxide particle and a second water-soluble polymer, and
   a mixed layer located between the high refractive layer and the low refractive layer and which contains the first metal oxide particle, the second metal oxide particle and a third water-soluble polymer, wherein
   the low refractive layer has a refractive index that is smaller than a refractive index of the high refractive layer by 0.1 or more,
   the first metal oxide particle and the second metal oxide particle have different metal oxides,
   wherein, in the mixed layer, a ratio of the first metal oxide particle and the second metal oxide particle varies in steps or continuously varies,
   wherein each of the first metal oxide particle and the second metal oxide particle has a particle size of 4 nm to 100 nm, and
   wherein the mixed layer has a thickness that is 10 to 30% of a film thickness of a region of one of a high refractive layer or a low refractive layer, the one of a high refractive layer or a low refractive layer being adjacent to the mixed layer, the one of a high refractive layer or a low refractive layer having a maximum content of the metal oxide particle, and the region being defined as containing 75% or more of the maximum content of the metal oxide particle in the one of a high refractive layer or a low refractive layer.

2. The near-infrared reflective film according to claim 1, wherein the mixed layer is provided by simultaneous multiple layer coating of coating liquids which constitute the high refractive layer and the low refractive layer.

3. The near-infrared reflective film according to claim 1, wherein, in the high refractive layer or the low refractive layer, a mass ratio of the water-soluble polymer and the metal oxide particle is in a range of 0.3 to 10, wherein the mass ratio is mass of water-soluble polymer divided by mass of metal oxide particle.

4. The near-infrared reflective film according to claim 1, wherein the lamination unit is constituted by laminating a plurality of high refractive layers and low refractive layers having different optical film thicknesses.

5. A near-infrared reflector comprising:
   a substrate; and
   the near-infrared reflective film according to claim 1, wherein the film is provided on at least one side of the substrate.

6. A method of producing a near-infrared reflective film comprising forming two layers having different refractive indices and having different metal oxide particles, and a mixed layer located between the two layers having different refractive indices and in which a ratio of the different metal oxide particles continuously varies by simultaneous multiple layer coating of a first coating liquid containing a first water-soluble polymer and a first metal oxide particle and a second coating liquid containing a second water-soluble polymer and a second metal oxide particle,
   wherein each of the first metal oxide particle and the second metal oxide particle has a particle size of 4 nm to 100 nm, and
   wherein the mixed layer has a thickness that is 10 to 30% of a film thickness of a region of one of the two layers, the one of the two layers being adjacent to the mixed layer, the one of the two layers having a maximum content of the metal oxide particle, and the region being defined as containing 75% or more of the maximum content of the metal oxide particle in the one of the two layers.

7. The method of producing the near-infrared reflective film according to claim 6, wherein time from the simultaneous multiple layer coating of the first coating liquid and the second coating liquid to setting thereof is 5 minutes or less.

* * * * *